(12) United States Patent (10) Patent No.: US 12,654,201 B2

Dollar et al. (45) Date of Patent: Jun. 16, 2026

(54) SYSTEM AND METHOD OF APPLYING A COATING TO A VEHICLE

(71) Applicant: Ground Effects, LTD, Windsor (CA)

(72) Inventors: Benjamin William Dollar, Windsor (CA); Michael Scott Boyko, Amherstburg (CA); Robert William Scott, Windsor (CA); Bradley John Pattison, Windsor (CA)

(73) Assignee: Ground Effects, LTD, Windsor, CA (US)

( * ) Notice: Subject to any disclaimer, the term of this patent is extended or adjusted under 35 U.S.C. 154(b) by 0 days.

(21) Appl. No.: 19/235,002

(22) Filed: Jun. 11, 2025

(65) Prior Publication Data

US 2025/0303443 A1 Oct. 2, 2025

Related U.S. Application Data

(63) Continuation of application No. 15/623,926, filed on Jun. 15, 2017, now Pat. No. 12,403,502.

(Continued)

(51) Int. Cl.
B05D 7/14 (2006.01)
B05B 12/00 (2018.01)
(Continued)

(52) U.S. Cl.
CPC ............... B05D 7/14 (2013.01); B05B 12/20 (2018.02); B05D 1/06 (2013.01); B25J 11/0075 (2013.01);
(Continued)

(58) Field of Classification Search
CPC ............................ B05D 1/02; B05D 1/32–327
See application file for complete search history.

(56) References Cited

U.S. PATENT DOCUMENTS 4,300,198 A 11/1981 Davini
4,374,869 A 2/1983 Dorey, II et al.
(Continued)

OTHER PUBLICATIONS

Mike H., Camo quad how to camo, https://www.youtube.com/watch?v=2oxe_lyyiUY, Mar. 12, 2016.*
(Continued)

*Primary Examiner* — James M Mellott
(74) *Attorney, Agent, or Firm* — Benesch Friedlander Coplan & Aronoff LLP

(57) ABSTRACT

A system and method of applying a coating to a vehicle in sequence with vehicle manufacture is disclosed. The vehicle may be inspected and/or logged into inventory. The vehicle may be electronically recorded into inventory using a computerized data acquisition and/or process control system. The vehicle may be prepared by an operator. The vehicle preparation may include applying masking materials to at least a portion of the vehicle. The vehicle preparation may include application of a pre-treatment to at least a portion of the vehicle. A coating may be applied to at least a portion of the vehicle. The coating may include one or more layers. The masking materials may be removed from the vehicle after the completion of the coating application. The vehicle may be electronically recorded into inventory using a data acquisition and/or process control system. The vehicle may be delivered and/or returned to the vehicle manufacturer.

20 Claims, 26 Drawing Sheets

Related U.S. Application Data

(60) Provisional application No. 62/350,412, filed on Jun. 15, 2016.

(51) Int. Cl.
| | |
|---|---|
| B05B 12/20 | (2018.01) |
| B05B 13/00 | (2006.01) |
| B05D 1/06 | (2006.01) |
| B25J 9/00 | (2006.01) |
| B25J 11/00 | (2006.01) |
| B32B 15/04 | (2006.01) |

(52) U.S. Cl.
CPC .............. B32B 15/04 (2013.01); B05B 12/00 (2013.01); B05B 13/00 (2013.01); B05D 7/142 (2013.01); B25J 9/00 (2013.01)

(56) References Cited

U.S. PATENT DOCUMENTS

| | | | |
|---|---|---|---|
| 4,764,667 A | 8/1988 | Abe et al. | |
| 4,974,895 A | 12/1990 | Davenport | |
| 5,689,415 A | 11/1997 | Calotychos et al. | |
| 5,814,398 A | 9/1998 | Kronz et al. | |
| 6,413,588 B1 | 7/2002 | Pettus | |
| 6,425,507 B1 | 7/2002 | Allen | |
| 6,462,160 B1 | 10/2002 | Ogawa et al. | |
| 6,572,949 B1 * | 6/2003 | Lewis ..................... | B05B 12/24 |
| | | | 428/102 |
| 6,826,497 B1 | 11/2004 | Collins | |
| 7,387,819 B2 | 6/2008 | Emch et al. | |
| 7,504,133 B2 | 3/2009 | Cuyler et al. | |
| 7,611,772 B2 | 11/2009 | Barancyk et al. | |
| 8,168,299 B1 | 5/2012 | Locke | |
| 8,746,164 B2 | 6/2014 | Molz et al. | |
| 11,260,422 B2 | 3/2022 | Dollar et al. | |
| 2002/0198618 A1 | 12/2002 | Madden et al. | |
| 2003/0155067 A1 | 8/2003 | Syron | |
| 2003/0224198 A1 | 12/2003 | Cuyler et al. | |
| 2005/0061239 A1 | 3/2005 | Kyontani | |
| 2005/0103889 A1 | 5/2005 | Langeman | |
| 2007/0048445 A1 | 3/2007 | DiMario | |
| 2007/0200383 A1 | 8/2007 | Cuyler et al. | |
| 2009/0104393 A1 | 4/2009 | Asano et al. | |
| 2010/0026743 A1 | 2/2010 | Van Thillo et al. | |
| 2010/0101492 A1 | 4/2010 | Sarajain et al. | |
| 2012/0313392 A1 | 12/2012 | Bingle | |
| 2015/0147460 A1 | 5/2015 | Manzi et al. | |
| 2017/0136697 A1 | 5/2017 | Kia et al. | |
| 2017/0203580 A1 | 7/2017 | Martins Pinto | |
| 2017/0259288 A1 | 9/2017 | Scott | |
| 2017/0341105 A1 | 11/2017 | Arace et al. | |
| 2017/0361355 A1 | 12/2017 | Dollar et al. | |

OTHER PUBLICATIONS

Hunt Midwest, Automotive Alley—Ground Effects SubTropolis Fly-Through, found at https://huntmidwest.com/industrial-space-for-lease/subtropolis-tentant-case-studies/case-study-ground-effects/ and https://www.youtube.com/watch?v=Cgk-nwjcLug, Sep. 30, 2014.

Bob Shipp, Ship-To vs. Ship-Through Ordering: What's Better? WorkTruck, https://www.worktruckonline.com/146092/ship-to-vs-ship-thru-ordering-whats-better-for-you-fleet, Nov. 1, 2008.

Weber, Outsourcing the line, https://www.assemblymag.com/articles/84382-outsourcing-the-line, Jun. 1, 2006.

GFT—Polyurea Spray Coating, Ground Effects, web.archive.org/web/20150309075357/htt://www.gfxltd.com:80/products-services/sub-page?pg=polyurea-spray-coating; Mar. 9, 2015.

Follett, Non-core activities can be simplified and improved with outsourcing, https://www.plantservices.com/articles/2003/13/?show=all, Feb. 18, 2003.

Inside Indiana Business, https://neindiana.com/news/ground-effects-llc-planning-jobs-for-fort-wayne, Jul. 3, 2013.

GFX—Mass Vehicle Customization—Ford, https://web.archive.org/web/20150309075340/http://www.gfxltd.com/products-services/ sub-page?pg=ford, Mar. 9, 2015.

GM supplier builds new production facility, https://www.greaterfortwayneinc.com/gm-supplier-builds-new-production-facility/, Aug. 26, 2013.

Chevy Silverado and GMC Sierra Forum—factory spray on bed liner, https://www.silveradosierra.com/threads/ factory-spray-on-bed-liner.213802/, Mar. 2014-Apr. 2014.

Dodge Ram Forum—Ram spray in bed liner or aftermarket?, https://www.ramforumz.com/threads/ ram-spray-in-bed-liner-or-aftermarket.183837/, Sep. 2014.

Chevy Colorado & GMC Canyon—Factory?? Spray-in bed liner, https://www.ramforumz.com/threads/ ram-spray-in-bed-liner-or-aftermarket.183837 /, Nov. 2014.

GFX Ford Bed Liner, Ben Dollar, https://www.youtube.com/watch?v=_ 4QKU0C-GG8.

Automotive Alley—Ground Effects SubTropolis Fly-Through, https://www.youtube.com/watch?v=CgK-nwjcLug.

Line-X Spray-on Truck Bed Liners, https://www.youtube.com/watch?v=797vHu47XCU&t=14s, 2013.

Austin Weber, Outsourcing the Line, https://www.assemblymag.com/articles/84382-outsourcing-the-line, Jun. 1, 2006.

Blackout Hood Logo Mod, found at https://www.youtube.com/watch?v=XStl09zA 1 EU, Sep. 9, 2013.

Classiczcars.com; https://www.classiczcars.com/forums/topic/30824-installing-emblems-drilling-through-paint/; Feb. 14, 2009.

International Search Report and Written Opinion issued in International Patent Application No. PCT/US2024/038721, mailing date Sep. 27, 2024.

Laser Knowledge, DP Laser, What is the Benefits of Laser Cleaning in Automotive Industry, https://dplaser.com/ the-benefits-of-laser-cleaning-in-automotive-industry/, Jun. 9, 2023.

Non-Final Office Action issued in U.S. Appl. No. 18/778,070 dated Dec. 19, 2025.

* cited by examiner

SYSTEM AND METHOD OF APPLYING A COATING TO A VEHICLE

CROSS-REFERENCE TO RELATED APPLICATIONS

This application is a continuation of U.S. application Ser. No. 15/623,926, filed Jun. 15, 2017, which application claims the benefit of U.S. provisional application No. 62/350,412, filed 15 Jun. 2016, the entire disclosures of which are hereby incorporated by reference as though fully set forth herein.

BACKGROUND a. Technical Field

The present disclosure relates to methods and systems of applying a coating to at least a portion of a vehicle, including applying a coating to at least a portion of a vehicle in sequence with vehicle manufacture.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

A coating may be applied to at least a portion of a vehicle, for example a cargo space, such as, but not limited to, a cargo bed of a pickup truck and/or a cargo area of a panel/delivery van. In some instances, the coating (e.g., aromatic urethane polyurea), commonly referred to as a "bed liner" may be applied by a third party (e.g., aftermarket) retailer after the vehicle has been delivered from the manufacturing facility. As a result, the manufacturer may have little or no control over the application (e.g., quality, consistency) of the bed liner and perhaps more importantly, the vehicle manufacturer may not be able to include the cost of the bed liner accessory to the vehicle price, thereby potentially increasing the profitability of the vehicle. Vehicle manufacturers have generally been unable and/or unwilling to commit to the investment of establishing facilities for large-volume application of bed liner coatings, for at least several reasons. First, applying bed liner coating may require specialized and/or expensive equipment for application. Second, bed liner coating application may be time-consuming, as the vehicle may require extensive masking and/or other pre- and post-treatment to avoid the bed liner coating contacting unwanted areas (e.g., windows, painted surfaces). Third, bed liner coating application may be labor-intensive, requiring technicians to adequately prepare the vehicle for bed liner coating application and post-application treatment. Additionally, vehicle manufacture is already a complicated process. It may be impractical for a vehicle manufacturing facility to reconfigure a portion of its facility for bed liner application, when space is typically at a premium or not available. What is needed then is a system and method wherein a vehicle may be diverted from a vehicle manufacturing facility, transported to a bed liner coating application facility, a bed liner coating and/or other accessories may be applied to the vehicle, and the vehicle may be returned to the vehicle manufacturing facility.

The foregoing discussion is intended only to illustrate the present field and should not be taken as a disavowal of claim scope.

SUMMARY

Embodiments of the present disclosure may include a system and method of applying a coating to a vehicle, for example, in sequence with vehicle manufacture. A vehicle may be received from a vehicle manufacturer (e.g., vehicle assembly plant, vehicle importation facility, vehicle storage lot). The vehicle may be inspected and/or logged into inventory at a bed liner application facility. The vehicle may be electronically recorded into inventory using a computerized data acquisition and/or process control system. The vehicle may be prepared by an operator. The vehicle preparation may include cleaning and/or modifying the vehicle. The vehicle preparation may include applying masking materials to at least a portion of the vehicle. The vehicle preparation may include application a bonding agent to at least a portion of the vehicle. A coating may be applied to at least a portion of the vehicle. The coating may include one or more components. The coating may include components that may be mixed before and/or during application to the vehicle. The coating may include one or more layers. The coating layers may be applied to the vehicle using different processes and/or techniques. The masking materials may be removed from the vehicle after the completion of the coating layer application. The coating layers of the vehicle may be inspected for predetermined characteristics. The vehicle may be modified and/or returned to a condition prior to preparation for the coating application. The vehicle may be electronically recorded into inventory using a computerized data acquisition and/or process control system. The vehicle may be delivered and/or returned to the vehicle manufacturer.

In embodiments, a method of applying a coating to a vehicle may include preparing the vehicle to receive the coating, cleaning at least a portion of the vehicle to receive the coating, applying at least one mask to adjacent areas of the portion of the vehicle to receive the coating, applying at least one pre-coating treatment to the first portion of the vehicle to receive the coating, applying a layer of the coating to the portion of the vehicle; and removing the mask from the adjacent areas of the portion of the vehicle.

In embodiments, a method of applying a coating to a vehicle may include applying the layer of coating in a predetermined path.

In embodiments, a method of applying a coating to a vehicle may include preparing a molded, machined, and/or fabricated masking aid and may include applying the masking aid to a component located within the portion of the vehicle to receive the coating.

In embodiments, a method of applying a coating to a vehicle may include an electronic vehicle inventory and tracking system, wherein the system may record the progress of the vehicle in the application of the coating.

In embodiments, a method of applying a coating to a vehicle may include a database containing vehicle dimensions and attributes that may define the characteristics of at least the portion of the vehicle.

In embodiments, a method of applying a coating to a vehicle may include an electronic vehicle inventory and tracking system that may be in electronic communication with coating application equipment, wherein the coating application equipment may include at least one robot and at least one material delivery controller.

In embodiments, a method of applying a coating to a vehicle may include a database containing information pertaining to at least one vehicle accessory, wherein the at least one vehicle accessory may be removed and/or installed in the application of the coating.

In embodiments, a method of applying a coating to a vehicle may include applying at least a second layer of the coating on top of at least a portion of the first layer of the coating, wherein the predetermined path of the second layer application of the coating may be different from the predetermined path of the first layer application of the coating.

In embodiments, a method of applying a coating to a vehicle may include at least a second layer application of the coating that may be applied after a predetermined period of time has elapsed since the first layer application.

In embodiments, a method of applying a coating to a vehicle may include applying a texture layer of the coating on top of the at least one layer of the coating, wherein the predetermined path of the texture layer application of the coating may be different from the predetermined paths of the at least first and/or at least second layer application of the coating.

In embodiments, a method of applying a coating to a vehicle may include an application of a texture layer of the coating that may result in a coating surface with a predetermined coefficient of friction.

In embodiments, a system of applying a coating to a vehicle may include at least one programmable robot, at least one coating applicator, operably connected to the at least one robot, at least one computer control system, operably connected to the at least one robot, at least one coating supply system, operably connected to the at least one coating applicator, and at least one raw material supply system, wherein the at least one raw material supply system includes at least one coating storage vessel, and at least one pressurization system to dispense the coating via the at least coating applicator.

In embodiments, a system of applying a coating to a vehicle may include an electronic vehicle inventory and tracking system, wherein the system may record the progress of the vehicle and communicates with the programmable robot.

In embodiments, a system of applying a coating to a vehicle may include a database that may contain vehicle attributes and/or dimensions.

In embodiments, a system of applying a coating to a vehicle may include at least one pre-coating treatment applicator that may be operably connected to at least one programmable robot.

In embodiments, a system of applying a coating to a vehicle may include at least one pre-coating treatment applicator that may be integrated with at least one coating applicator.

In embodiments, a system of applying a coating to a vehicle may include temporary and/or permanent masking devices that may cover a portion of the vehicle to be coated.

In embodiments, a system of applying a coating to a vehicle may include temporary and/or permanent masking devices that may be configured using at least design data of the vehicle to selectively engage a portion of the vehicle to receive the coating, thereby preventing the coating of the portion of the vehicle that may be engaged by the temporary and/or permanent masking devices.

In embodiments, a system of applying a coating to a vehicle may include temporary and/or permanent masking devices that may be configured to be secured to a portion of the vehicle to receive the coating.

In embodiments, a system of applying a coating to a vehicle may include at least one programmable logic controller (PLC), wherein the PLC is in electronic communication with at least one of: at least one programmable robot, at least one coating applicator, operably connected to the at least one robot, at least one computer control system, operably connected to the at least one robot, at least one coating supply system, at least one raw material supply system, wherein the at least one raw material supply system includes at least one coating storage vessel and at least one pressurization system to dispense the coating via the at least one coating applicator.

The foregoing and other aspects, features, details, utilities, and advantages of the present disclosure will be apparent from reading the following description and claims, and from reviewing the accompanying drawings.

5

6

Figure 18:
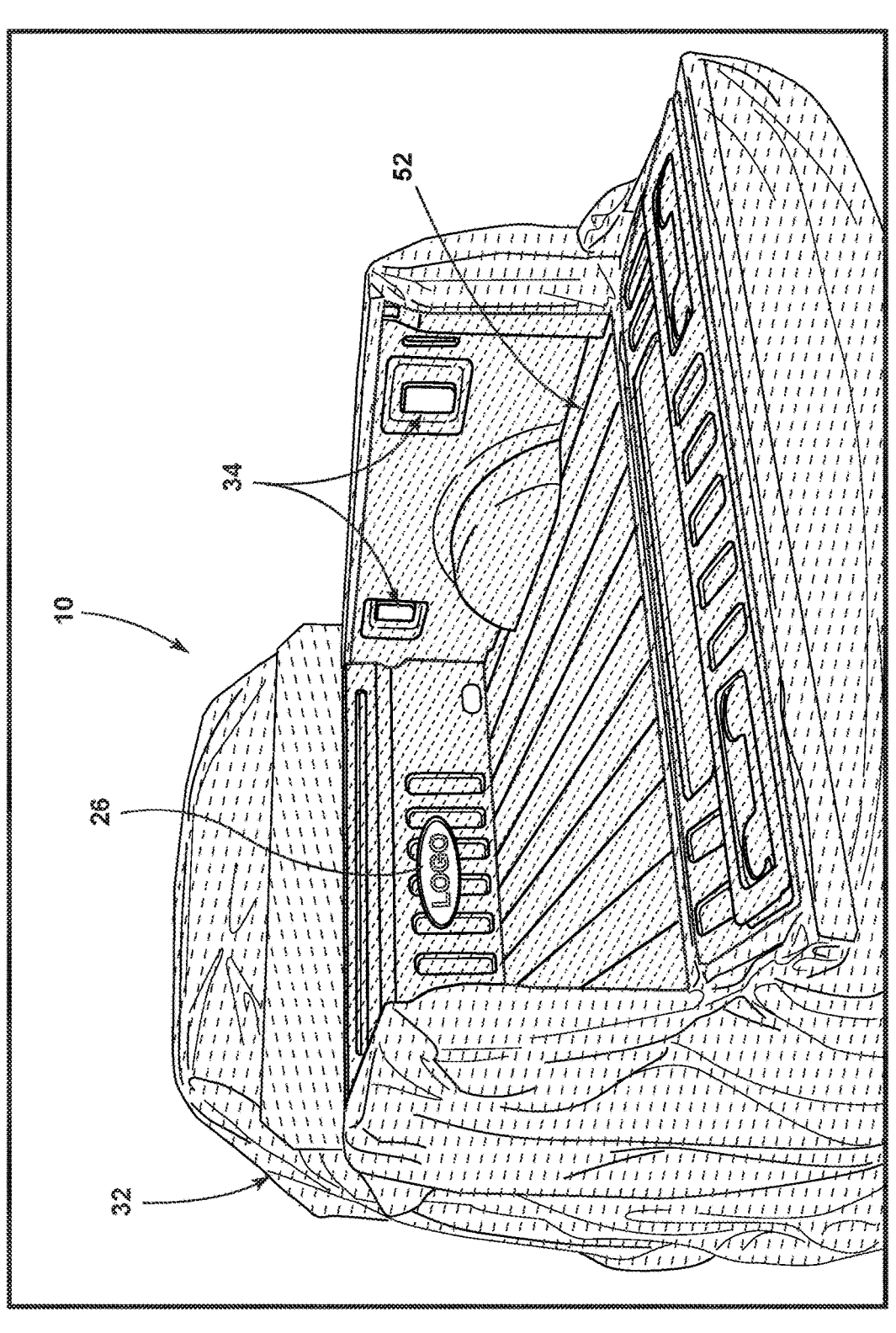

FIG. 18 is a pictorial view generally illustrating an embodiment of applying a coating to a vehicle, in accordance with teachings of the present disclosure.

Figure 19:
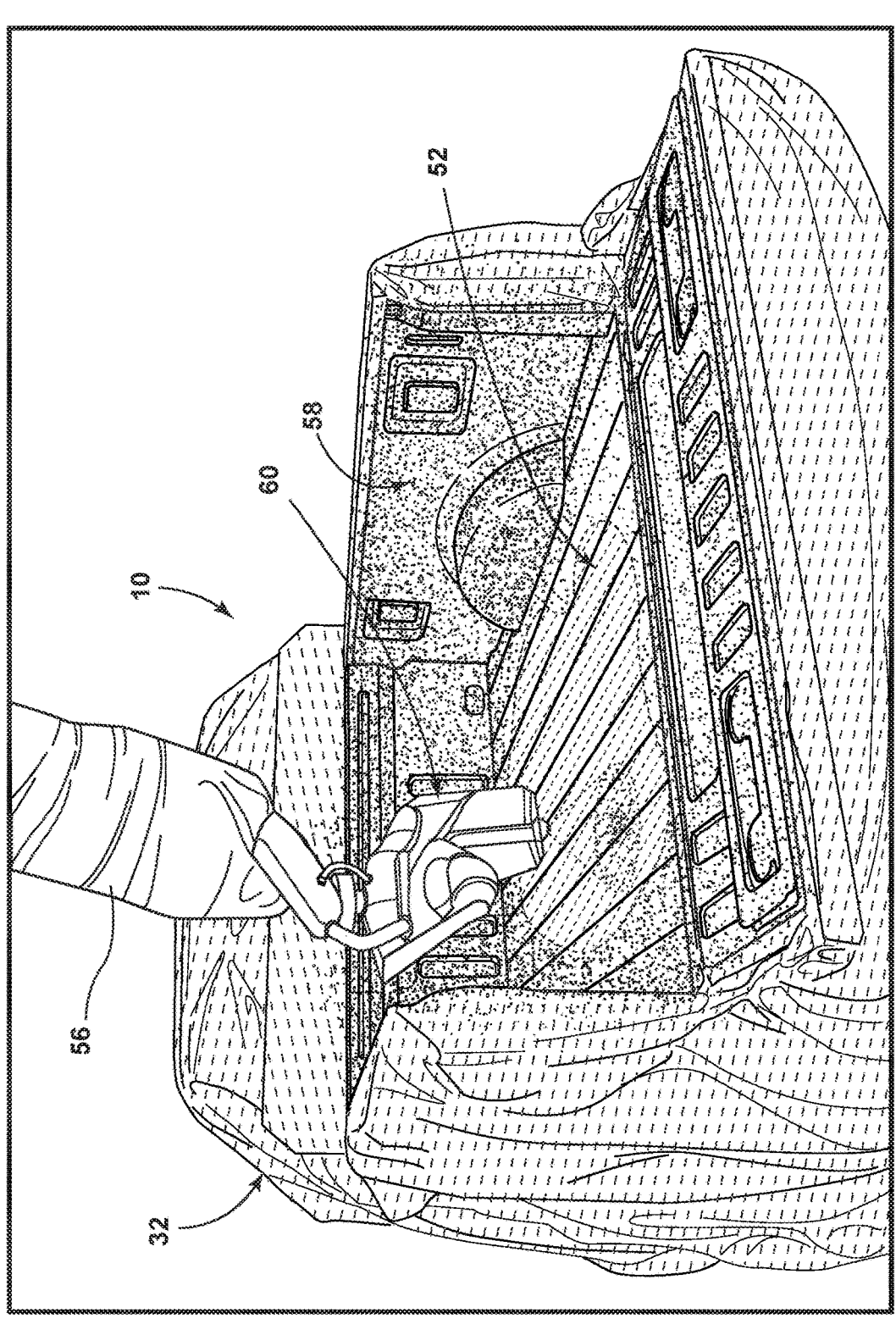

FIG. 19 is a pictorial view generally illustrating an embodiment of applying a coating to a vehicle, in accordance with teachings of the present disclosure.

Figure 20:
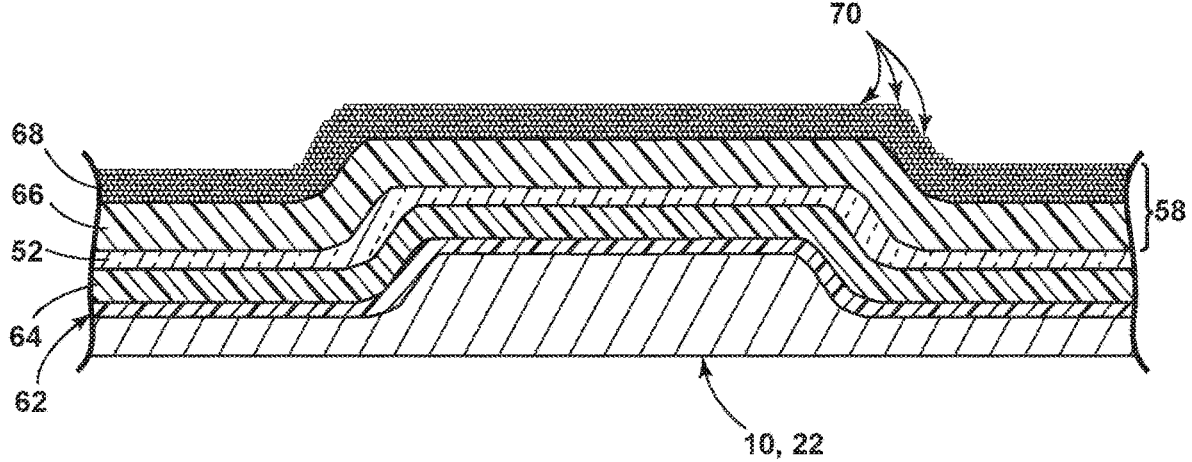

FIG. 20 is a cross-sectional view generally illustrating an embodiment of applying a coating to a vehicle, in accordance with teachings of the present disclosure.

Figure 21:
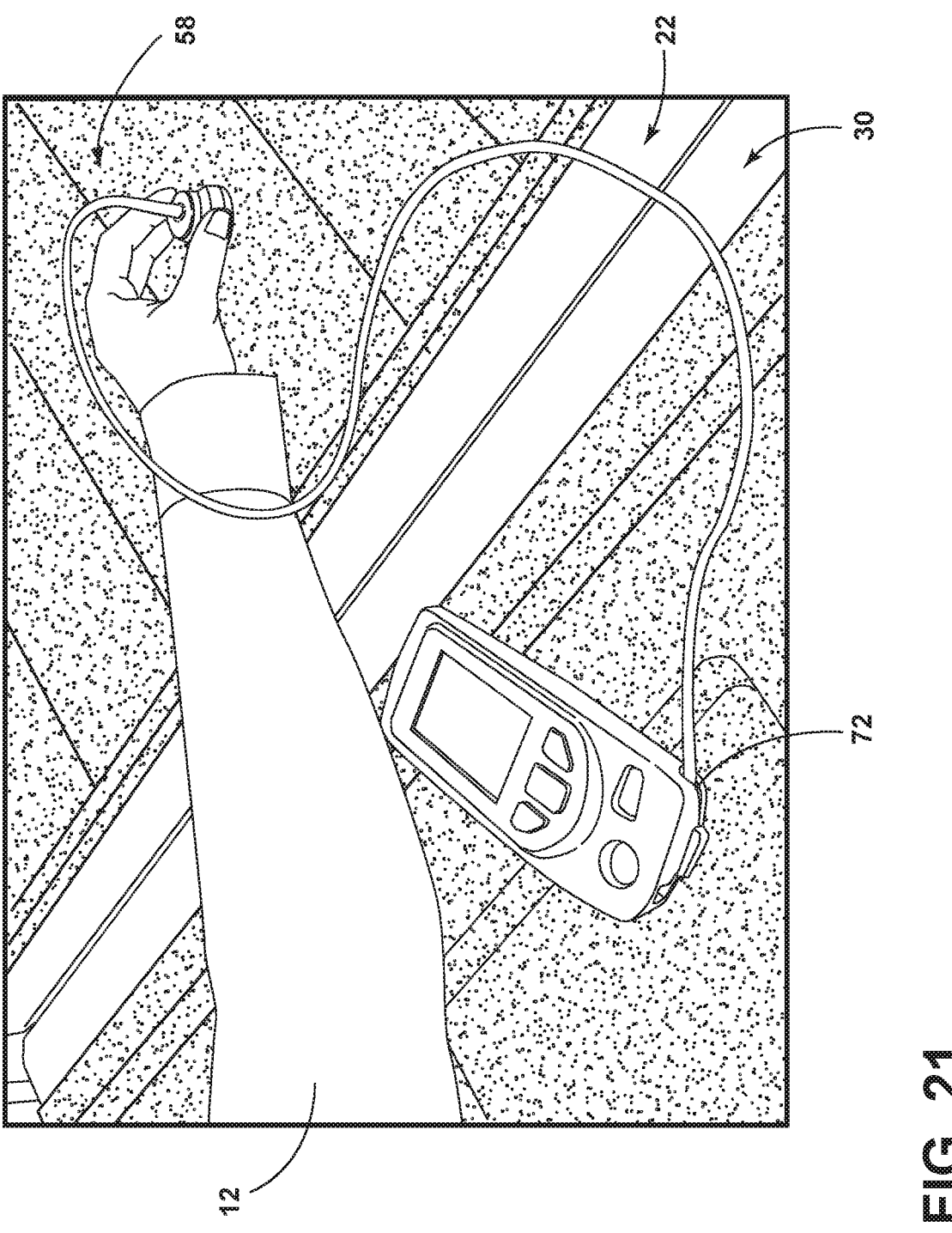

FIG. 21 is a pictorial view generally illustrating an embodiment of applying a coating to a vehicle, in accordance with teachings of the present disclosure.

Figure 22:
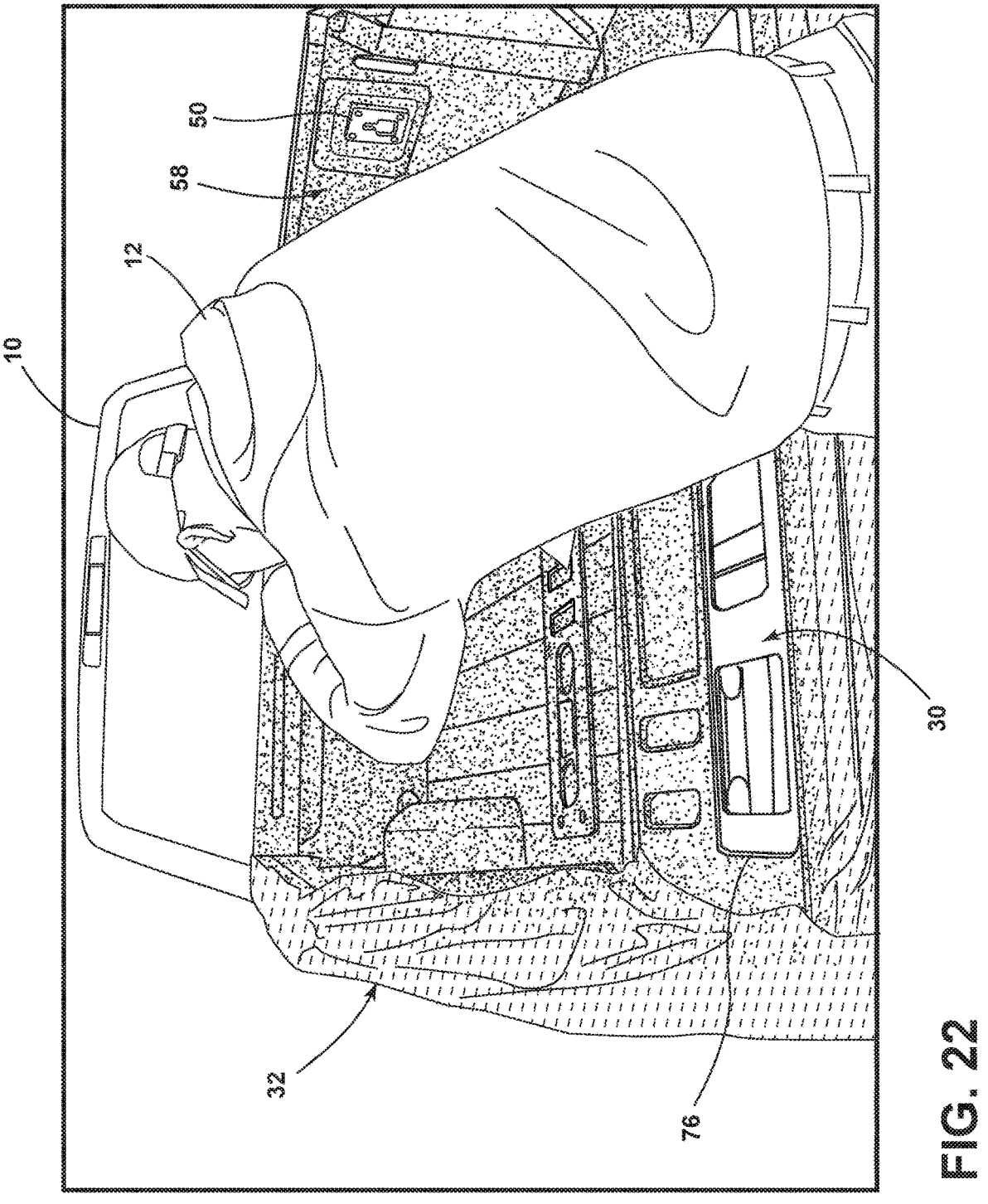

FIG. 22 is a pictorial view generally illustrating an embodiment of applying a coating to a vehicle, in accordance with teachings of the present disclosure.

Figure 23:
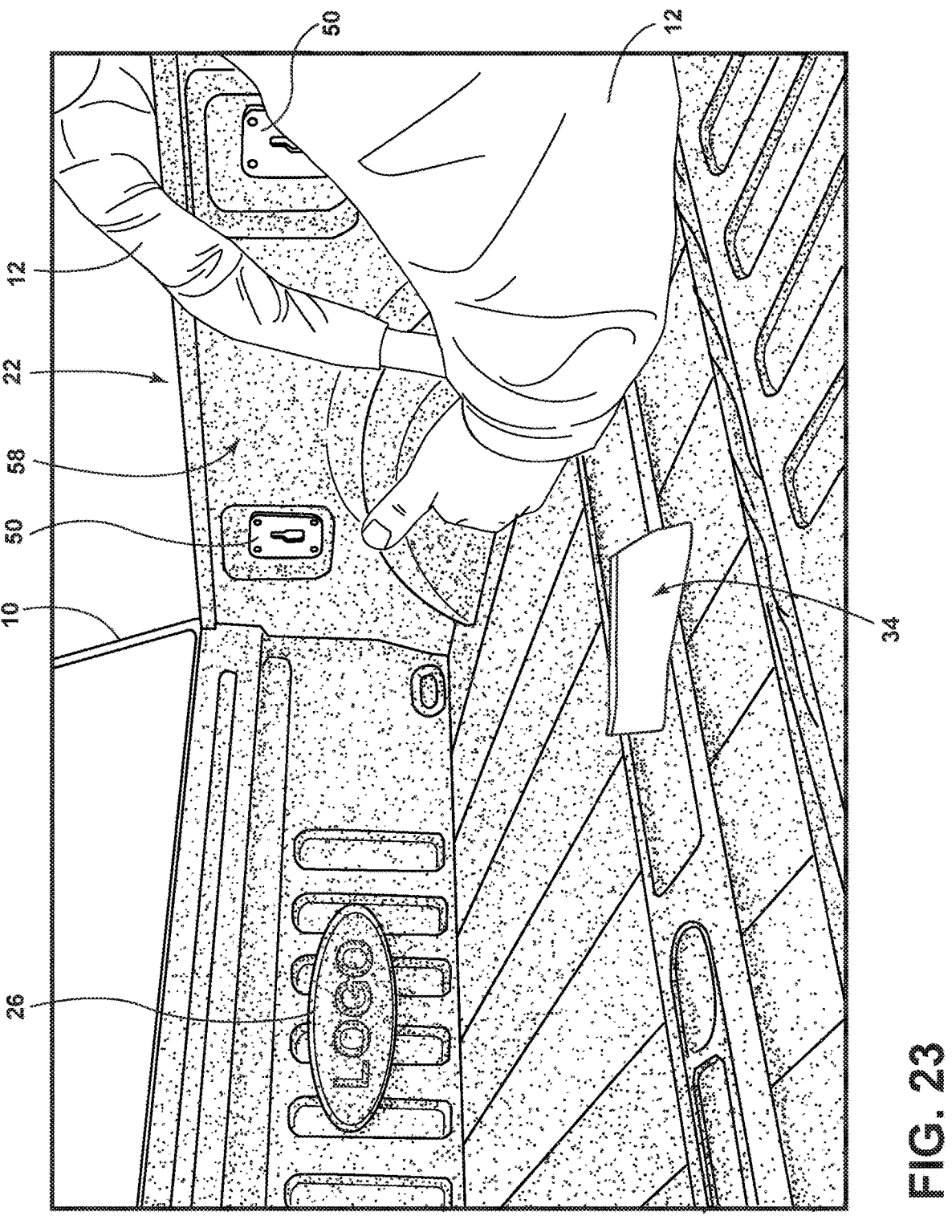

FIG. 23 is a pictorial view generally illustrating an embodiment of applying a coating to a vehicle, in accordance with teachings of the present disclosure.

Figure 24:
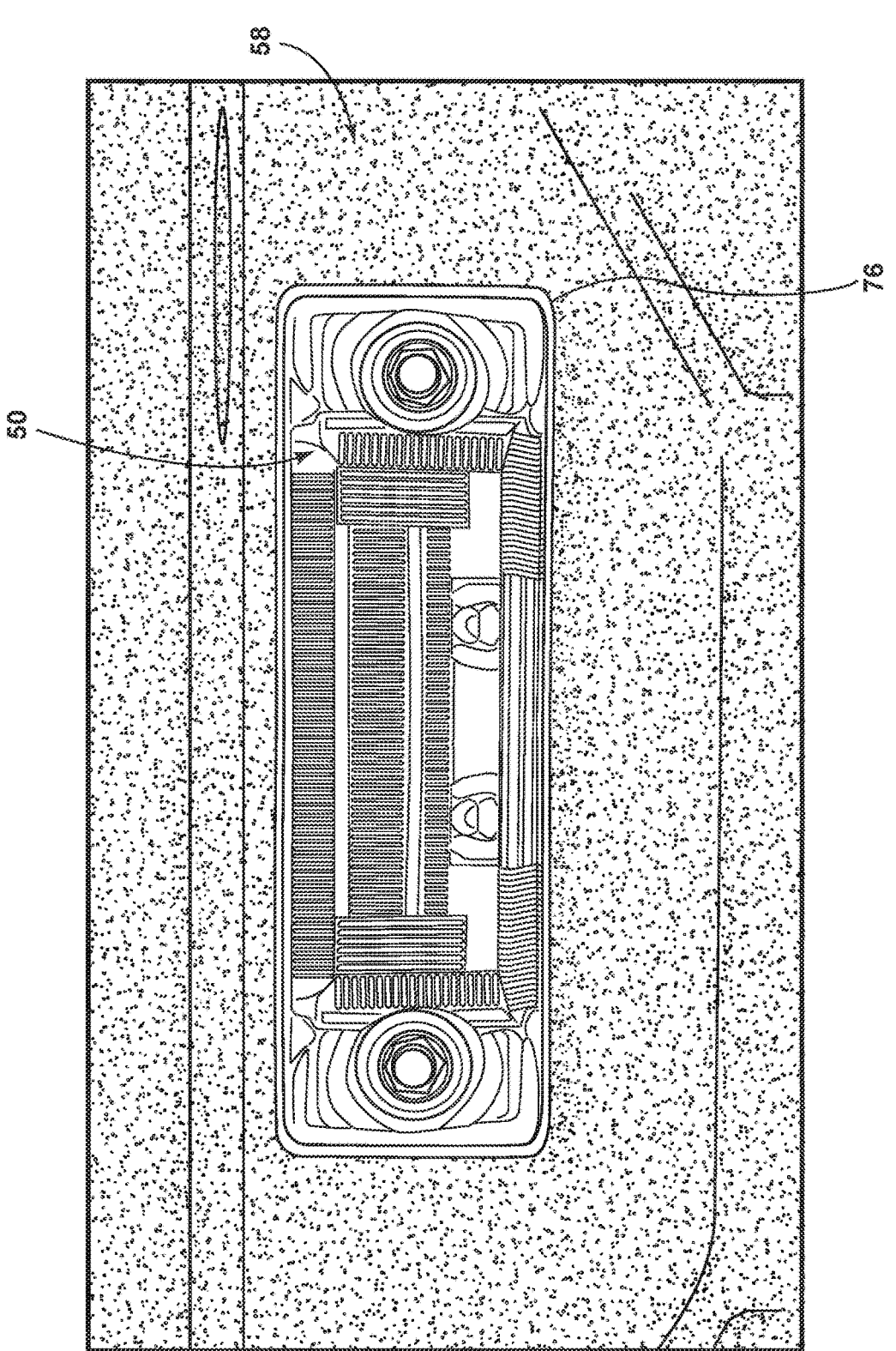

FIG. 24 is a pictorial view generally illustrating an embodiment of applying a coating to a vehicle, in accordance with teachings of the present disclosure.

Figure 25:
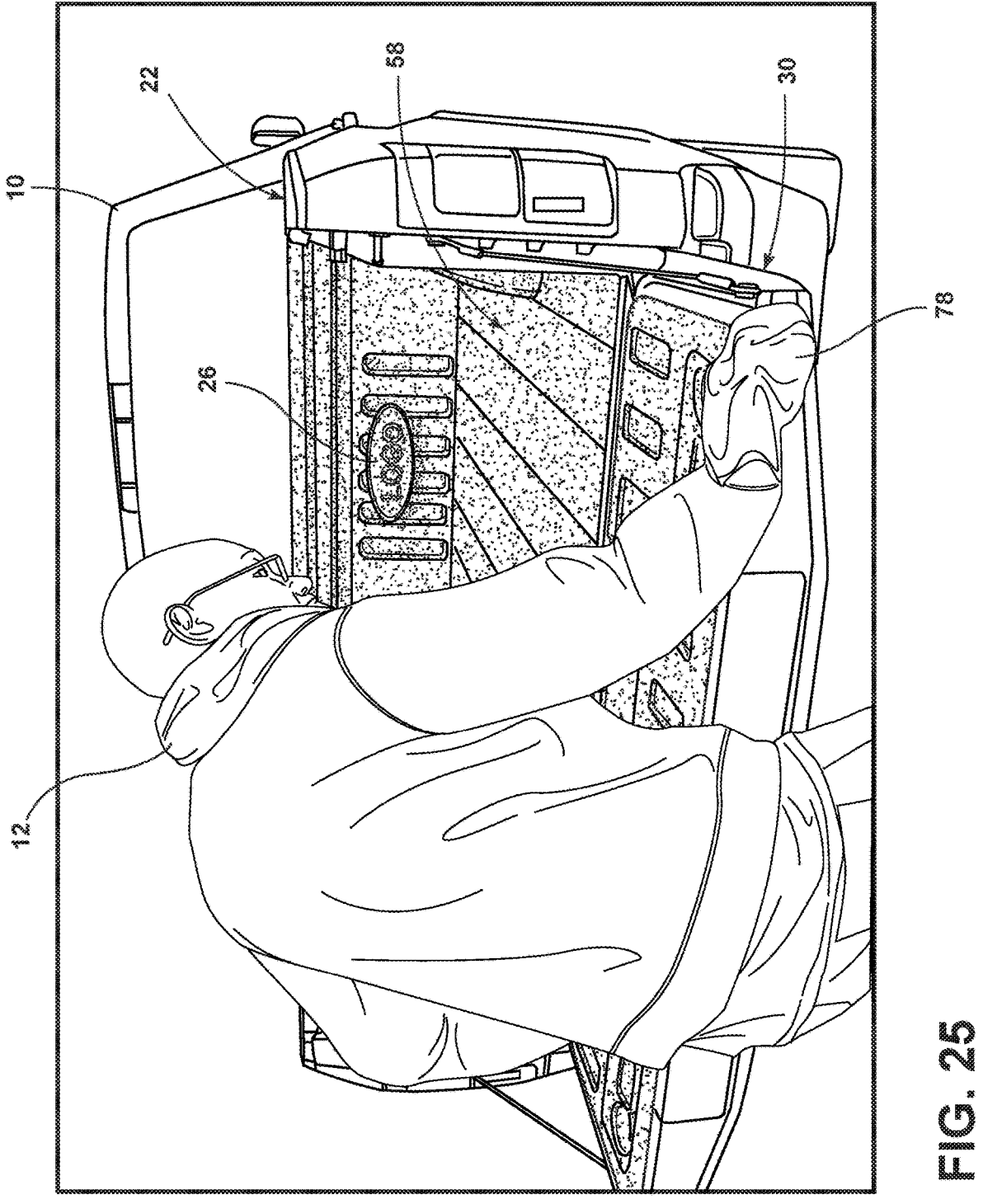

FIG. 25 is a pictorial view generally illustrating an embodiment of applying a coating to a vehicle, in accordance with teachings of the present disclosure.

Figure 26:
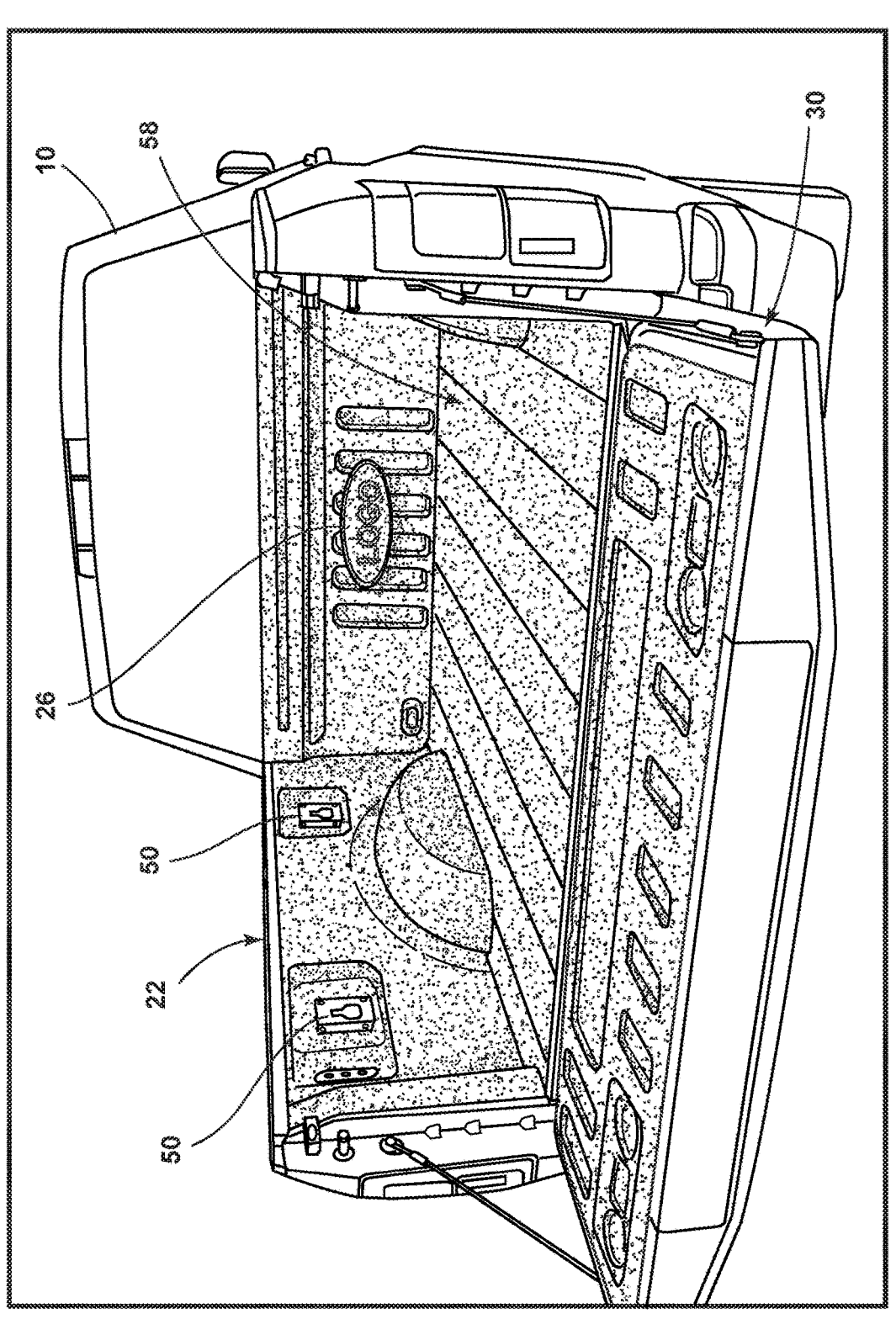

FIG. 26 is a pictorial view generally illustrating an embodiment of applying a coating to a vehicle, in accordance with teachings of the present disclosure.

Figure 27:
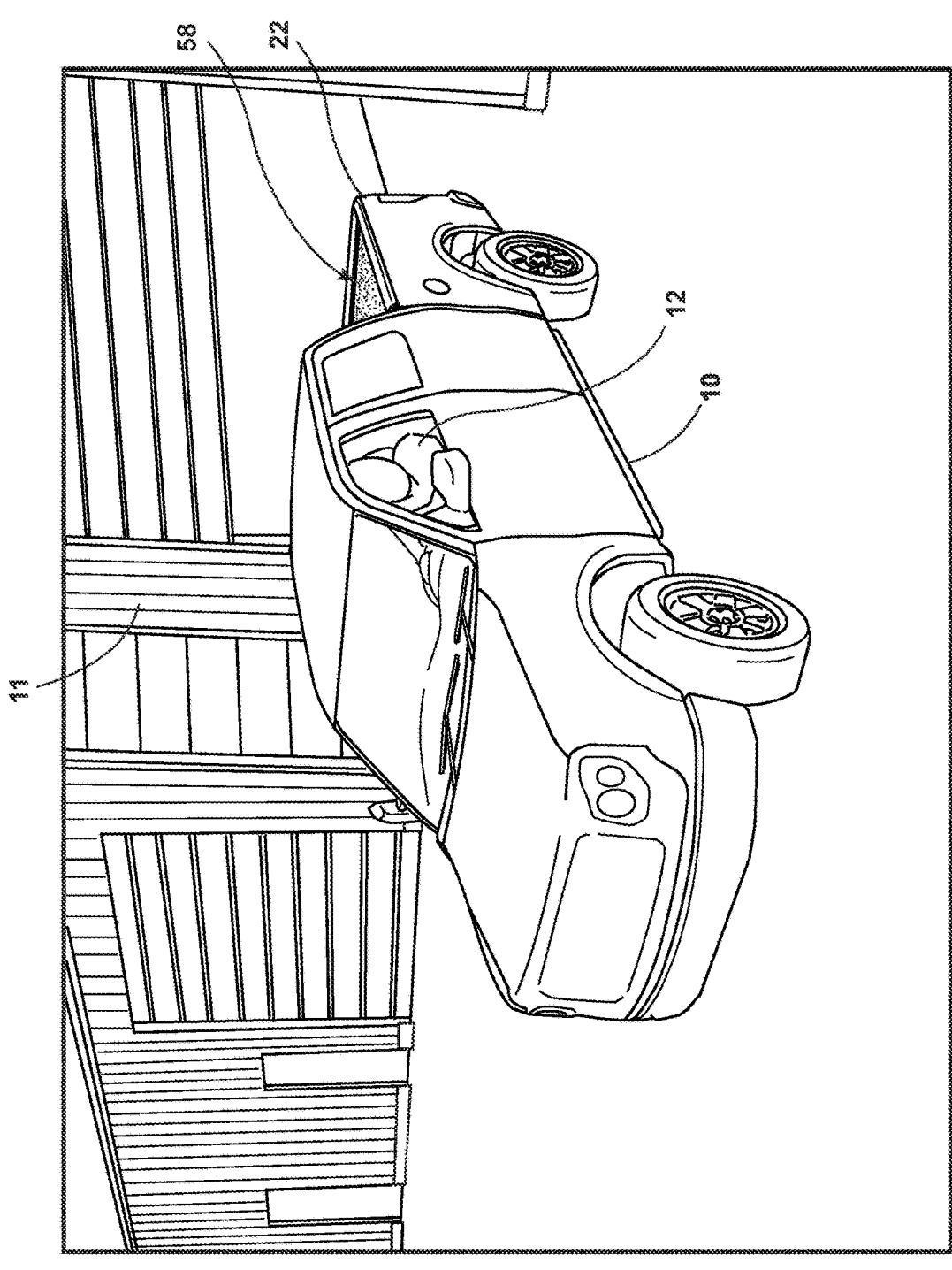

FIG. 27 is a pictorial view generally illustrating an embodiment of applying a coating to a vehicle, in accordance with teachings of the present disclosure.

DETAILED DESCRIPTION

Figure 1:
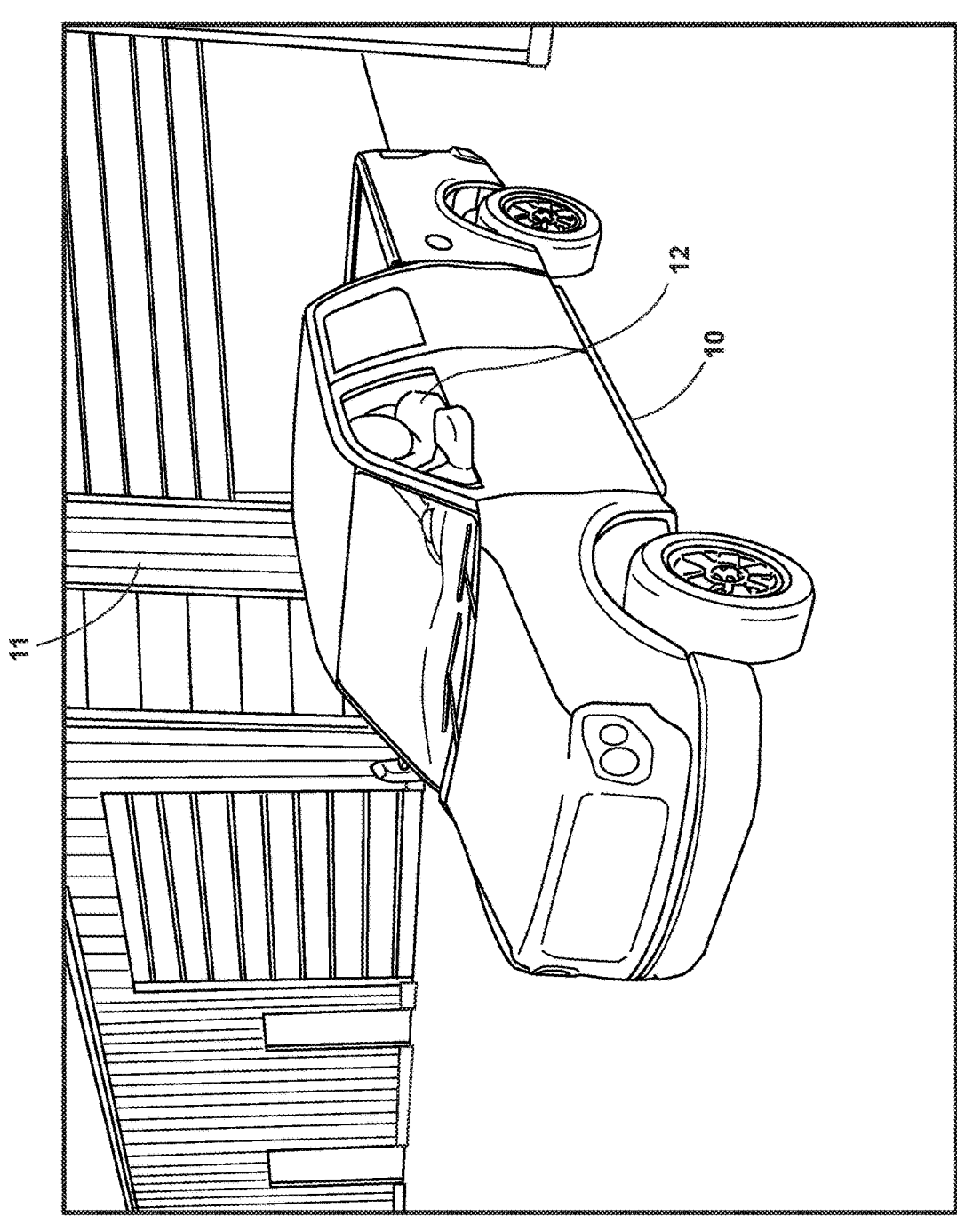
FIG. 1 is a pictorial view generally illustrating an embodiment of applying a coating to a vehicle, in accordance with teachings of the present disclosure.

Referring now the drawings, FIG. 1 generally illustrates a vehicle 10 (e.g., pickup truck) that may be configured to receive a bed liner coating (e.g., aromatic and/or aliphatic urethane polyurea), such as the cargo bed of vehicle 10. Vehicle 10 may be transported (e.g., driven, trailered) to a bed liner coating facility 11. Vehicle 10 may be received at and/or enter facility 11. An operator 12 may perform an inspection of vehicle 10. Operator 12 may inspect vehicle 10 for damage, defects, and/or to confirm the characteristics (e.g., length of cargo bed, number of driven wheels) of vehicle 10, for example. If vehicle 10 is approved by operator 12, vehicle 10 may proceed into facility 11 for further processing.

Figure 2:
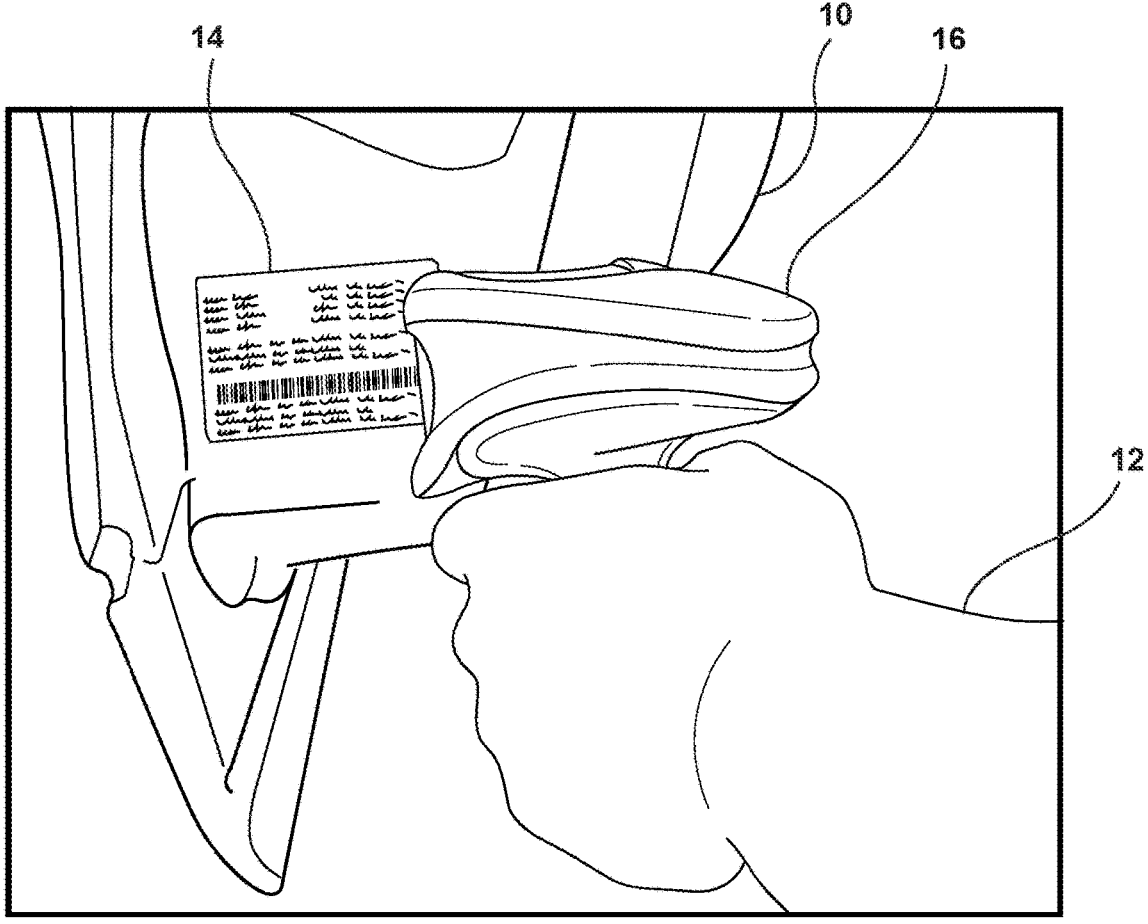
FIG. 2 is a pictorial view generally illustrating an embodiment of applying a coating to a vehicle, in accordance with teachings of the present disclosure.

FIG. 2 illustrates a vehicle 10, that may have a Vehicle Identification Number (VIN) 14 and/or other identification being scanned by an operator 12 who may be using a scanner 16 (e.g., laser bar code reader) and/or other tracking device. Vehicle 10 may then be electronically logged into a system database that may be located at facility 11 that may be configured to apply a bed liner coating and/or other vehicle accessories and/or modifications. Operator 12 may use scanner 16 to read additional information (e.g., accessories ordered, recall information, modifications required) pertaining to vehicle 10. Scanner 16 may include other data acquisition devices, such as, but not limited to, cameras, keyboards, and/or Radio Frequency Identification (RFID) transceivers. The information obtained by scanner 16 may include information concerning vehicle 10, such as, but not limited to, vehicle model year, vehicle manufacturer, vehicle body style, vehicle dimensions, vehicle drivetrain type, vehicle engine type, vehicle equipment, vehicle features, vehicle accessories, and/or vehicle paint code.

In embodiments, additional information regarding a vehicle 10 may be obtained by an operator 12. Additional bar codes, stickers, and/or other documentation may be transmitted to (e.g. electronically mailed) and/or included with vehicle 10 received by facility 11 from the vehicle manufacturer and/or vehicle distributor. This information may pertain to additional content to be added to and/or removed from vehicle 10. For example, in addition to a bed liner coating that may be applied to vehicle 10, other equipment (e.g., side steps, loading ramps, cargo management systems, decals, wheels, seat covers) may also be installed on vehicle 10 at facility 11. Some or all of the additional equipment may impact the application of the coating to vehicle 10. For example, some equipment may be applied to vehicle 10 before the bed liner coating, such as side steps. In other situations, some equipment may be applied to vehicle 10 after the coating, such as a cargo management system that may be located at least partially in the cargo bed 22 of vehicle 10. In other embodiments, equipment such as cargo hooks and/or shipping materials, may be removed from and/or replaced on vehicle 10.

In embodiments, a portable electronic device (e.g., tablet computer, laptop computer, mobile phone) may be used by an operator 12 in conjunction with and/or as a substitute for a scanner 16 that may obtain additional information that may pertain to vehicle 10. Operator 12 may, in addition to scanning vehicle 10, enter and/or modify information manually into the tablet computer, for example. The additional information pertaining to vehicle 10 may be sent electronically (e.g., wirelessly) to a computer that may be located in facility 11 and/or may be equipped with a VIN tracker database program. The VIN tracker database program may process (e.g., compare, analyze) the information received via operator 12 and/or scanner 16 with other information that may be supplied from other sources (e.g., vehicle manufacturer build data). The VIN tracker database program and/or the computer may determine if vehicle 10 should proceed for coating and/or other modification or if vehicle 10 should be additionally reviewed due to conflicting vehicle information. If the VIN tracker database program determines that vehicle 10 is cleared for coating and/or other modification, operator 12 may position vehicle 10 in sequence with other previously approved vehicles 10 in facility 11.

A VIN tracker database program may be a software program (e.g., application, or "app") that may include an embedded database containing information (e.g., characteristics) of a vehicle 10, such as, but not limited to, manufacturing, design, and/or equipment information.

The VIN tracker database program may use a scanner 16 and/or other electronic devices (e.g., wireless scanners, tablets) and may track vehicle 10 throughout some or all of the coating process. In embodiments, the VIN tracker database program may track vehicle 10 through the entire process from receipt at a facility 11 to shipping from facility 11. The VIN tracker database program may receive additional information regarding vehicle 10 as it is scanned by an operator 12 throughout the coating process, such as via the Internet. Additionally and alternatively, equipment (e.g., coating applying programmable robots) and/or sensors (e.g., cameras, RFID devices) within facility 11 may detect the progress of vehicle 10 and/or may report the position of vehicle 10 to the VIN tracker database program and/or to others (e.g., the vehicle manufacturer). The VIN tracker database program may allow data collection pertaining to vehicle 10 and/or the coating process, such as process and/or production control. The VIN tracker database program may communicate using electronic systems (e.g., computer networks, wireless and/or wired systems, electronic mail) and/ or may report process and/or production control information (e.g., quality, statistics) within facility 11. Additionally and alternatively, the VIN tracker database program may communicate the same information to off-site locations (e.g., vehicle manufacturer).

Figure 3:
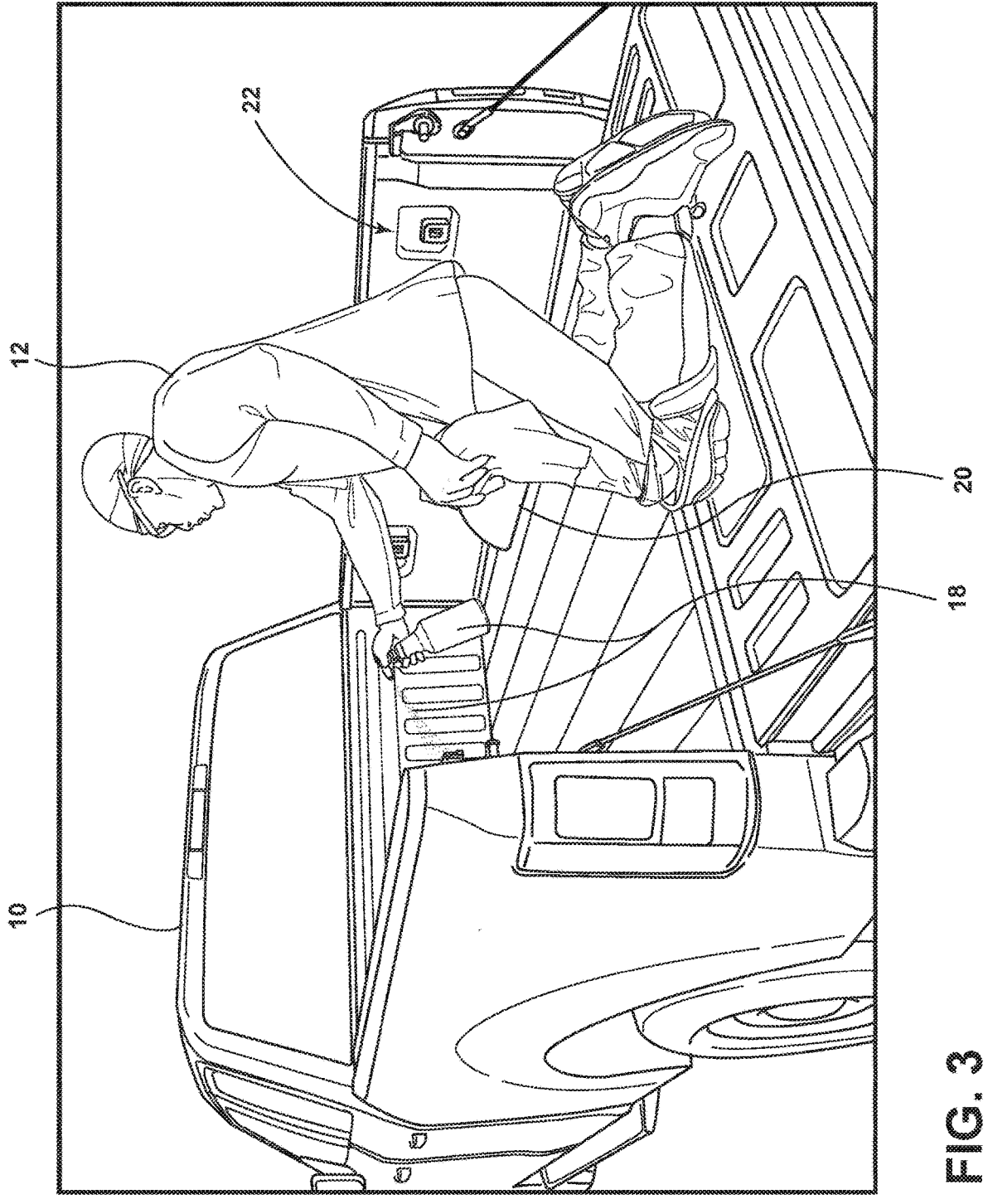
FIG. 3 is a pictorial view generally illustrating an embodiment of applying a coating to a vehicle, in accordance with teachings of the present disclosure.
Figure 4:
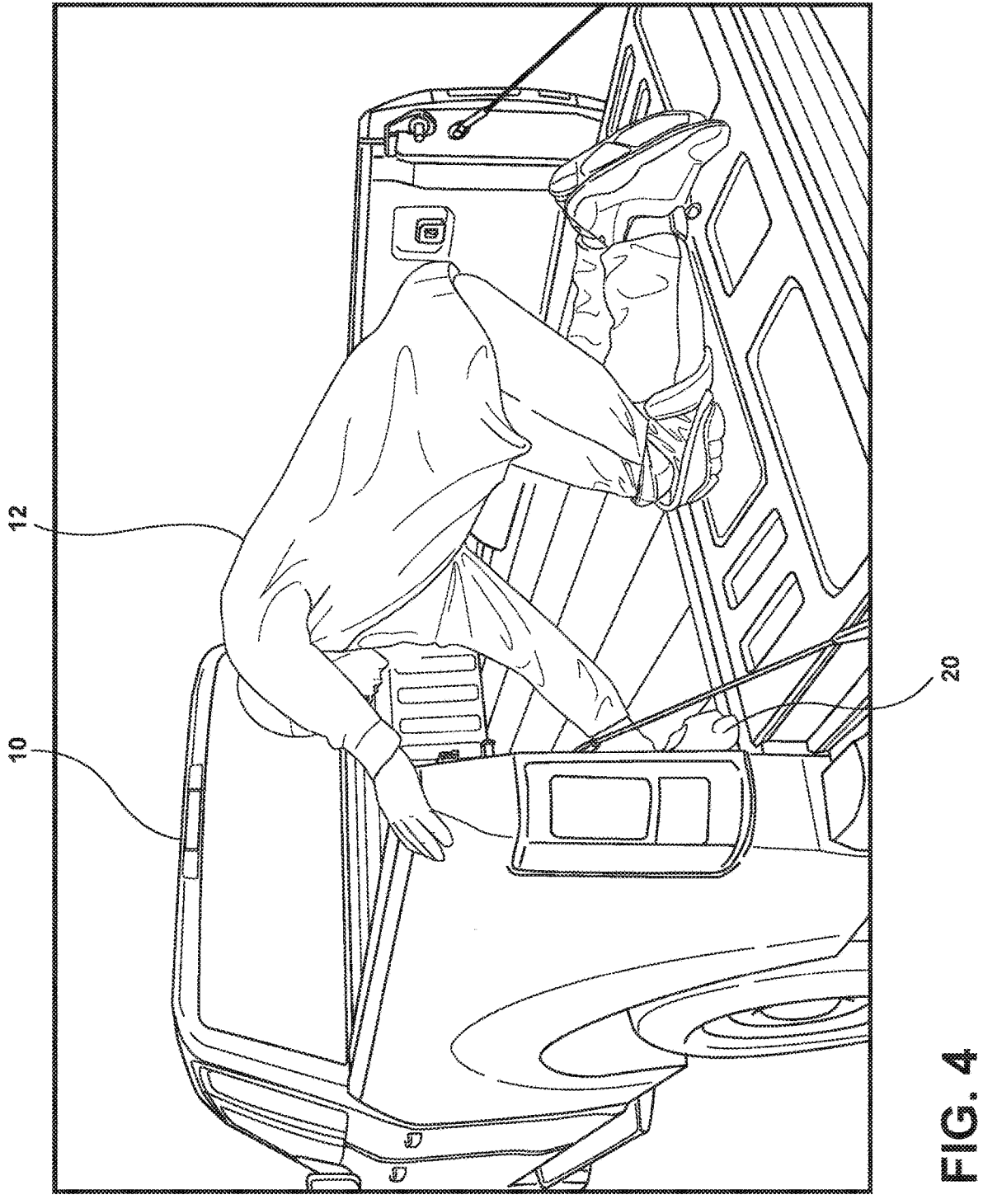
FIG. 4 is a pictorial view generally illustrating an embodiment of applying a coating to a vehicle, in accordance with teachings of the present disclosure.

FIGS. 3 and 4 generally illustrate a vehicle 10 being prepared for bed liner coating by an operator 12. Depending upon the condition of vehicle 10 as received, operator 12 may clean (e.g., wash) vehicle 10 to remove any dirt, water, snow, and/or debris from vehicle 10, including but not limited to a cargo bed 22. Vehicle 10 may then be dried by operator 12 using towels, compressed air, and/or an automatic dryer. After vehicle 10 and/or cargo bed 22 has been thoroughly cleaned and/or dried, operator 12 may apply a cleaning agent 18 (e.g., solvent) using a dispenser (e.g., spray bottle) to cargo bed 22, and/or may use a towel 20 to wipe cleaning agent 18 on the surfaces (e.g., sides, floor, tailgate) of cargo bed 22.

Figure 5:
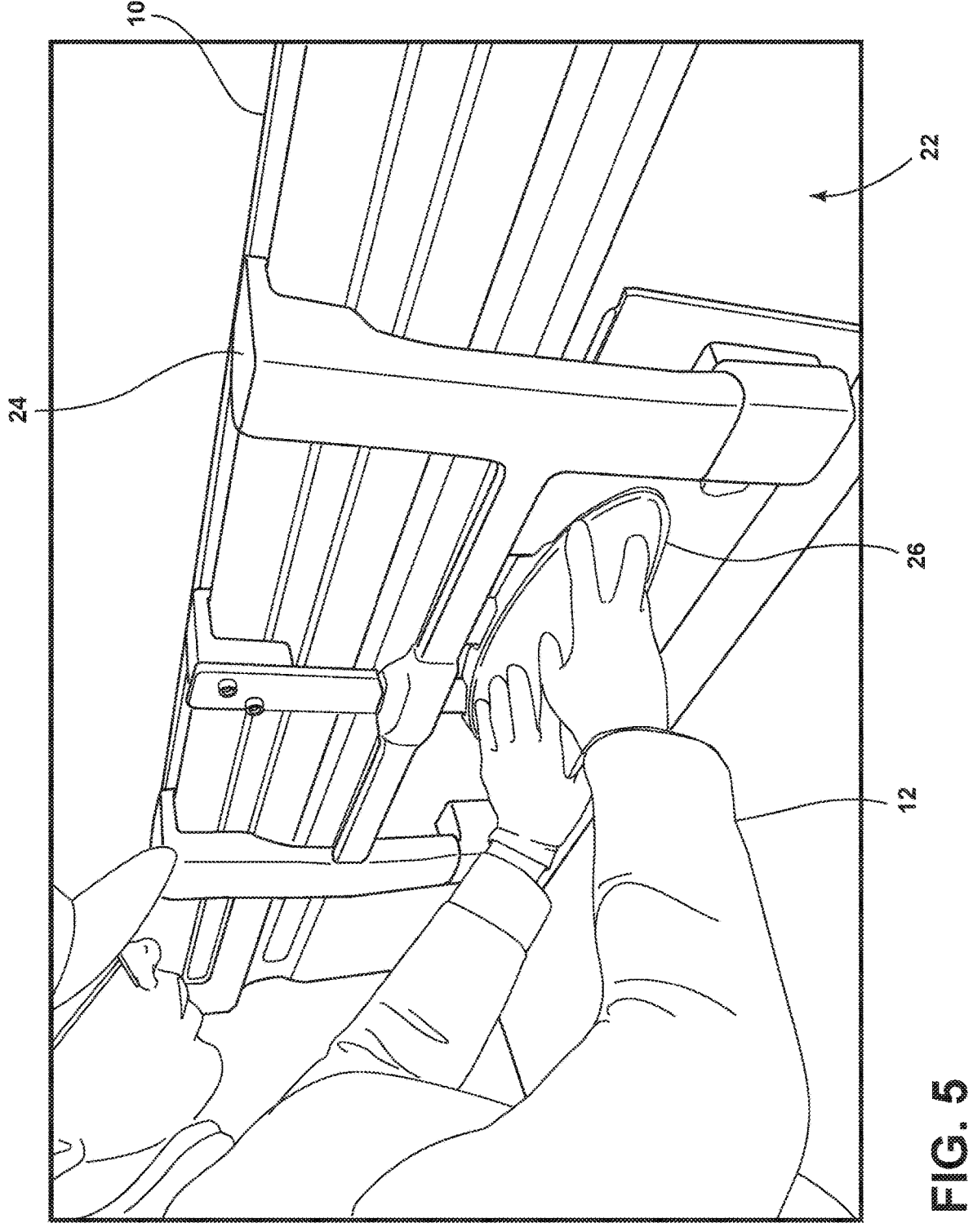
FIG. 5 is a pictorial view generally illustrating an embodiment of applying a coating to a vehicle, in accordance with teachings of the present disclosure.
Figure 6:
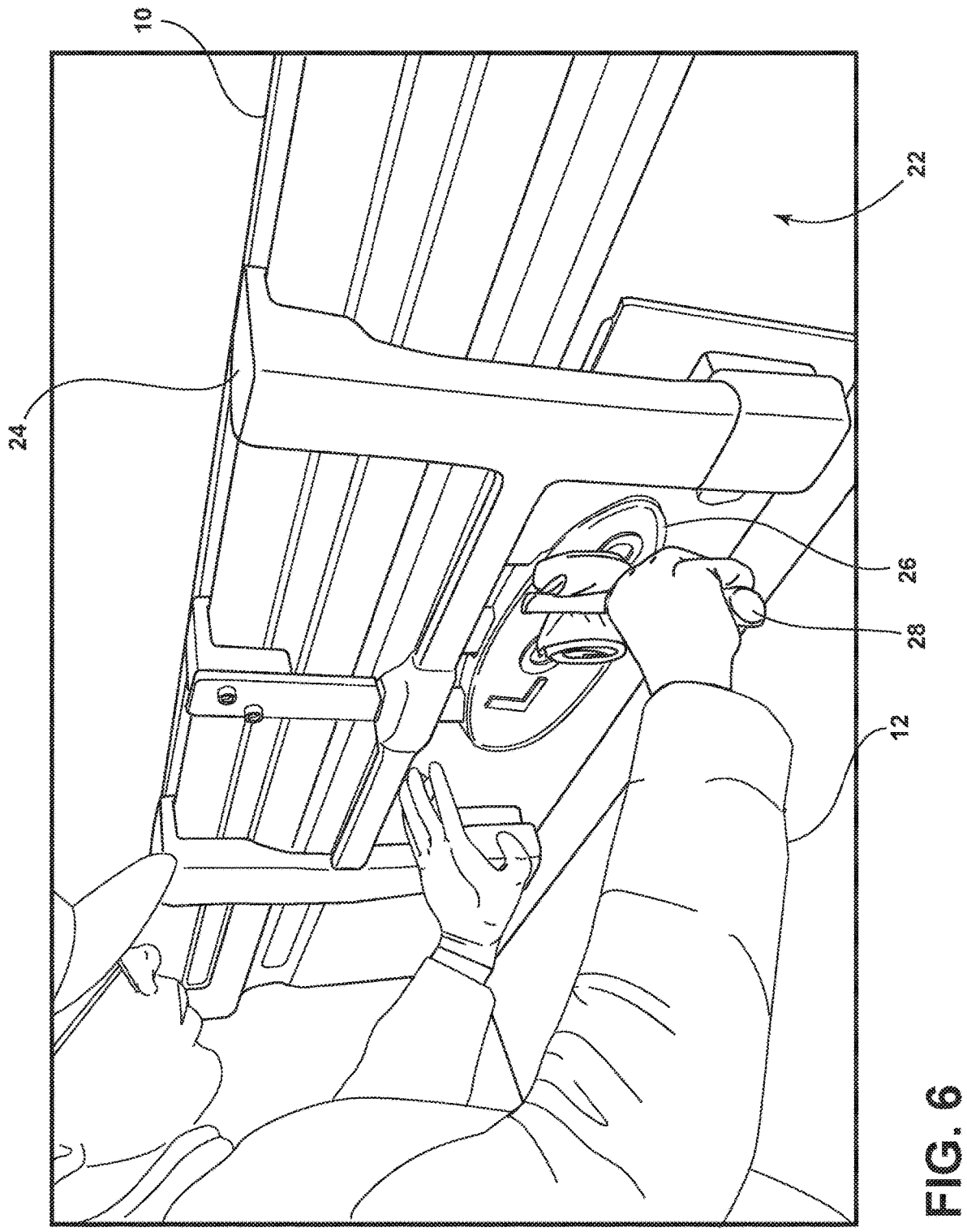
FIG. 6 is a pictorial view generally illustrating an embodiment of applying a coating to a vehicle, in accordance with teachings of the present disclosure.
Figure 7:
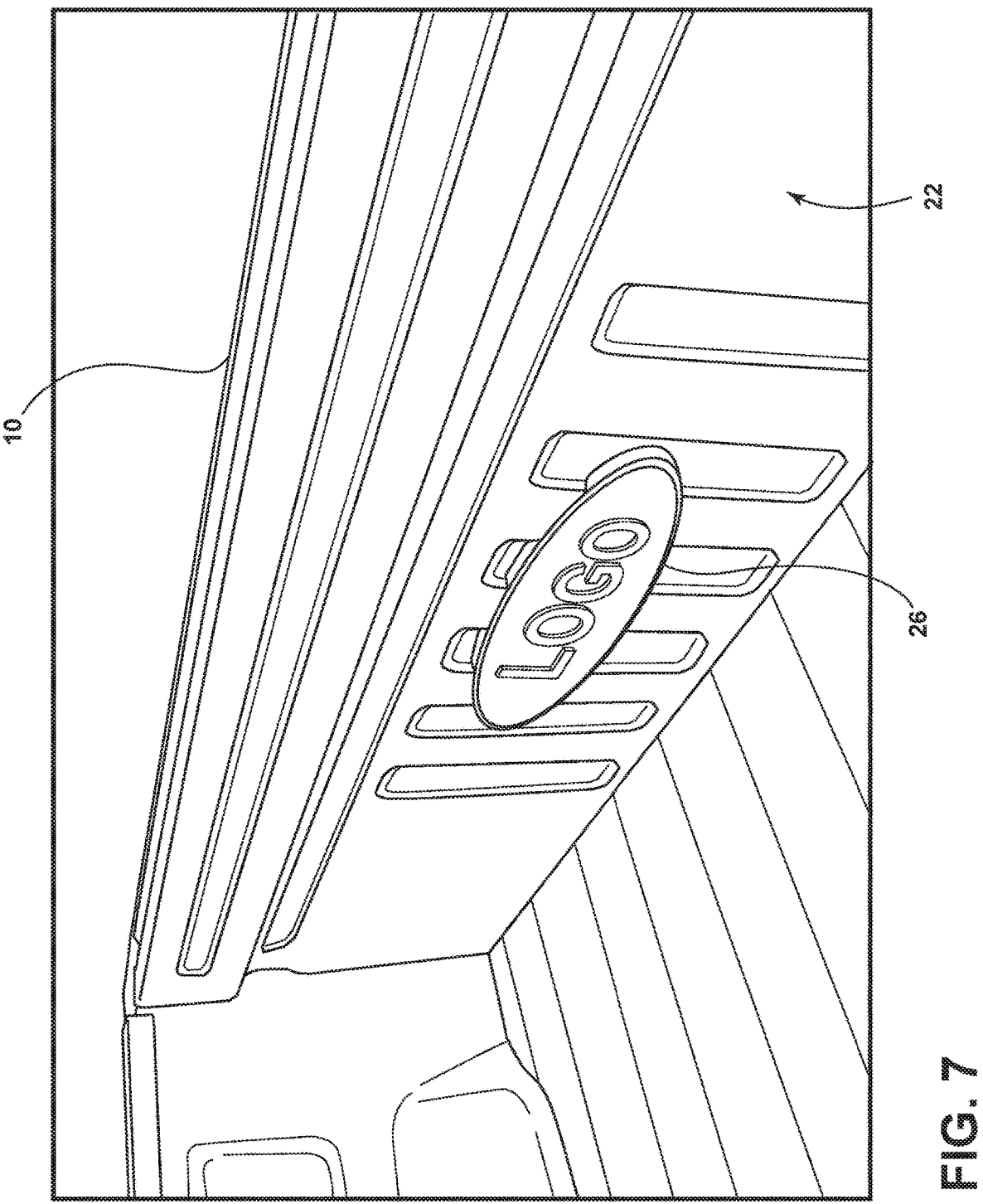
FIG. 7 is a pictorial view generally illustrating an embodiment of applying a coating to a vehicle, in accordance with teachings of the present disclosure.
Figure 8:
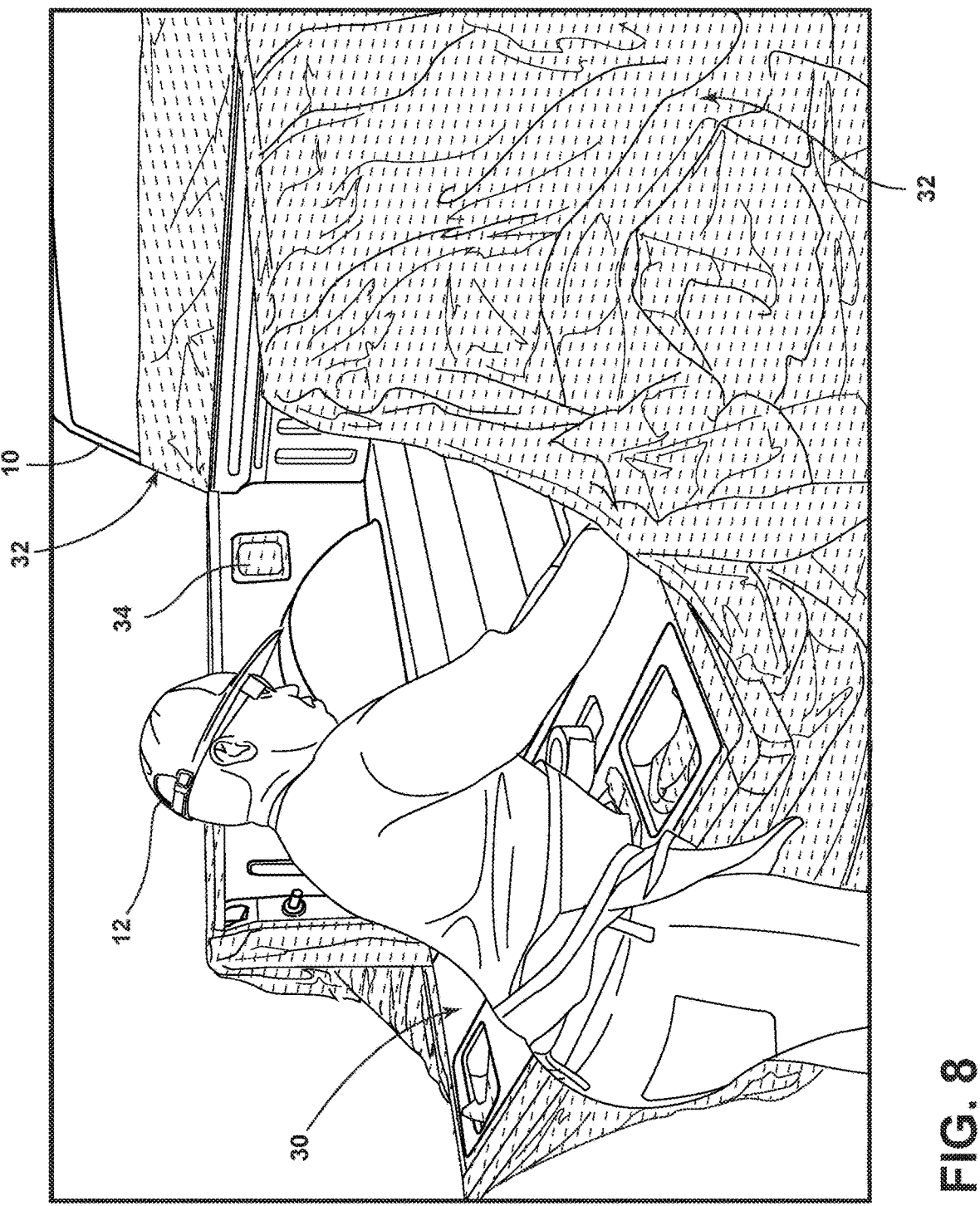
FIG. 8 is a pictorial view generally illustrating an embodiment of applying a coating to a vehicle, in accordance with teachings of the present disclosure.

FIGS. 5-7 generally illustrate a vehicle 10 that may be configured to receive a bed liner coating and/or a logo 26 (e.g., brand, emblem) on a portion of a cargo bed 22 of vehicle 10. Additionally and alternatively, logo 26 may be applied to another portion of vehicle 10 that may receive bed liner coating. Logo 26 may be configured to engage a portion (e.g., bulkhead, wall, tail gate) of cargo bed 22 that may include reinforcing surfaces (e.g., ridges) that may increase the strength and/or rigidity of logo 26. Logo 26 may be constructed of a polymer material (e.g., acrylonitrile butadiene styrene (ABS)). In embodiments, logo 26 may be constructed using other techniques such as, but not limited to, three-dimensional printing, injection molding, and/or stamping. Logo 26 may include a fastening device (e.g., two-sided adhesive tape, magnets, adhesive) that may permit logo 26 to be secured to a portion (e.g., bulkhead, sides, floor, tailgate) of cargo bed 22 of vehicle 10. In embodiments, logo 26 may include sealing elements (e.g., adhesive foam, adhesive tape, rubber/polymer seal) that may engage a surface of cargo bed 22.

The sealing elements may be configured about the perimeter of logo 26 and/or other locations (e.g., center) of logo 26. The sealing elements may permit logo 26 to remain in close proximity (e.g., contact) with a surface of cargo bed 22.

A fixture 24 may be used by an operator 12 to position a logo 26 consistently and/or accurately on a vehicle 10. Fixture 24 may permit the application of logo 26 in a particular location of cargo bed 22, such as, but not limited to, the center of the bulkhead (e.g., forward wall) of cargo bed 22 of vehicle 10. Fixture 24 may minimize inconsistencies (e.g., misalignments) in the application of logo 26 and/or may assist operator 12 in quickly and/or accurately applying logo 26. To install logo 26 on a surface of cargo bed 22, operator 12 may place fixture 24 on a portion of cargo bed 22. Fixture 24 may include locating devices (e.g., pins, magnets) that may permit fixture 24 to be accurately positioned relative to cargo bed 22. Operator 12 may remove the protective cover (e.g., backing) on logo 26 that may expose an adhesive surface. Using fixture 24, operator 12 may place logo 26 in an opening in fixture 24 configured to receive logo 26. Operator 12 may then press logo 26 against cargo bed 22 to promote adhesion of the two-sided tape to cargo bed 22. Operator 12 may utilize a roller 28 on a surface of logo 26 that may permit additional adhesion of the two-sided tape of logo 26 to cargo bed 22. Operator 12 may then remove fixture 24 from cargo bed 22. Logo 26 may be consistently applied by operator 12 using this technique, such that when the coating is applied, logo 26 may be coated (e.g., integrated) by the bed liner coating applied to cargo bed 22.

FIGS. 8-11 generally illustrate a vehicle 10 in the process of being configured and/or prepared for bed liner coating application. In embodiments, a cargo bed 22 (e.g., or another portion) of vehicle 10 may be configured to receive a bed liner coating and a portion of vehicle 10 (e.g., the remainder of the exterior) may be configured to not receive the bed liner coating using masking (e.g., covering) materials 32. An operator 12 may utilize masking materials 32 (e.g., large sheets of plastic and/or paper) that may cover portions of vehicle 10 and may prevent those portions from receiving coating (e.g., windows, exterior body panels, tail lights). Masking materials 32 may be configured in bulk (e.g., on a roll) and/or may be configured in custom-fabricated shapes for specific applications (e.g., fenders, windows). Masking materials 32 may include adhesive surfaces (e.g., edges) or other fastening devices that may temporarily engage portions of vehicle 10. In embodiments, masking materials 32 may also be secured to vehicle 10 using tape, such as, but not limited to, wire-embedded tape (not shown). In embodiments, operator 12 may apply the wire-embedded tape along a boundary between a portion of vehicle 10 that may receive the coating and a portion of vehicle 10 that may not receive the coating. The wire-embedded tape may be configured to seal securely against the boundary and/or provide a well-defined cut line (e.g., trim edge) when removed along with or in addition to masking materials 32 after the coating is applied and/or cured to a portion of vehicle 10.

Figure 9:
FIG. 9 is a pictorial view generally illustrating an embodiment of applying a coating to a vehicle, in accordance with teachings of the present disclosure.
Figure 10:
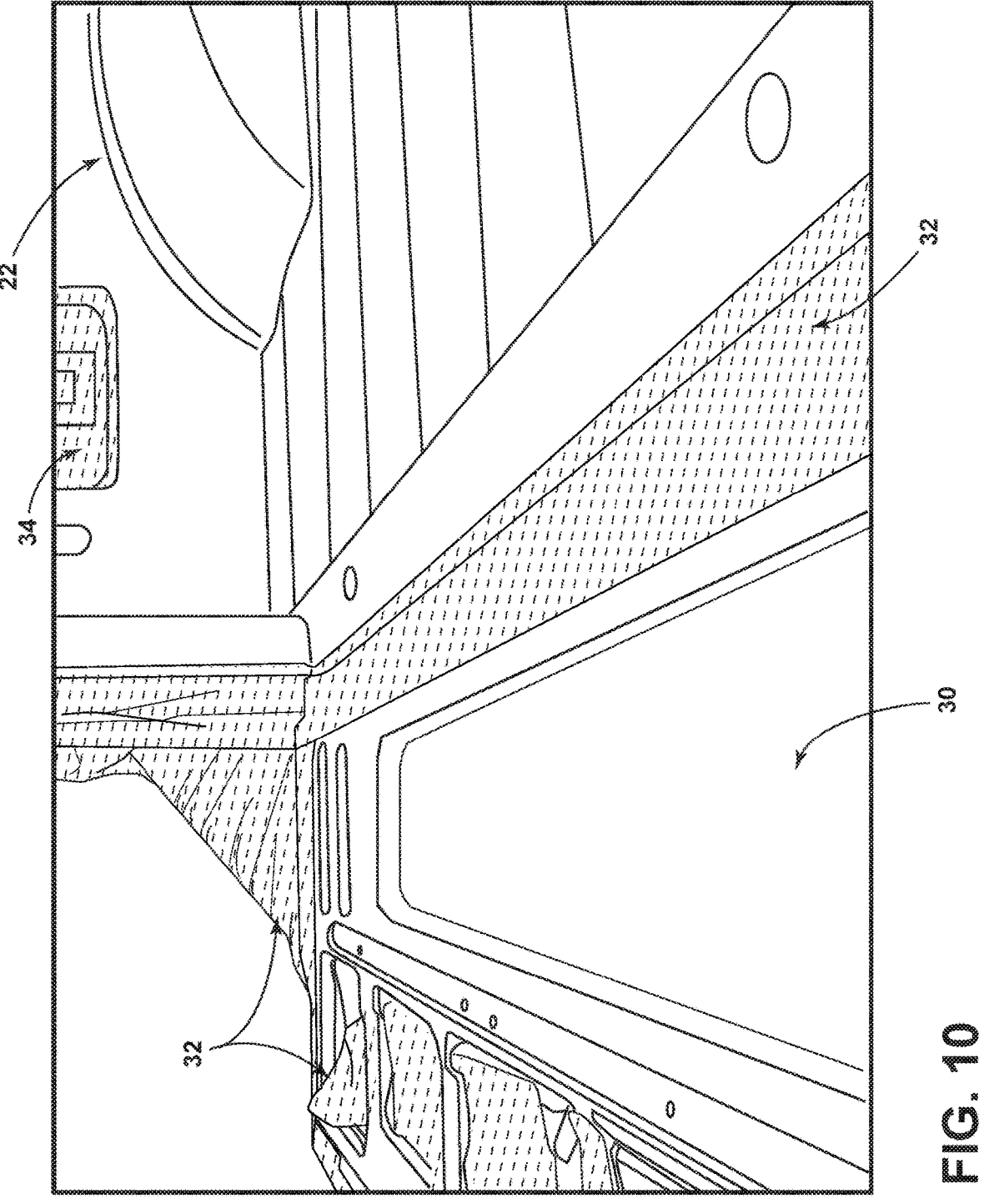
FIG. 10 is a pictorial view generally illustrating an embodiment of applying a coating to a vehicle, in accordance with teachings of the present disclosure.

Referring now to FIGS. 9 and 10, masking materials 32 may be applied by an operator 12 on portions of a cargo bed 22 of a vehicle 10, such as a tailgate 30 that may receive a bed liner coating. In embodiments, portions of tailgate 30 may not be coated with a bed liner coating. For example, portions of tailgate 30 may include accessories and/or equipment that may not be intended to be covered by coating, such as, but not limited to, a tailgate step, cargo securing devices, and/or tailgate handle mechanisms). Operator 12 may remove and/or modify some or all of the accessories and/or equipment of tailgate 30 of vehicle 10 prior to the application of the coating. In embodiments, masking materials 32 may be applied on top of some or all of the accessories and/or equipment of tailgate 30. In embodiments, operator 12 may apply masking materials 32 with or without wire-embedded tape about the perimeter of the accessories and/or equipment (e.g., lights, cargo hooks), or the openings (e.g., voids, holes) left by the accessories and/or equipment if removed by operator 12. Applying masking materials 32 may prevent the coating from entering areas that may be undesirable, such as the interior of tailgate 30.

Figure 11:
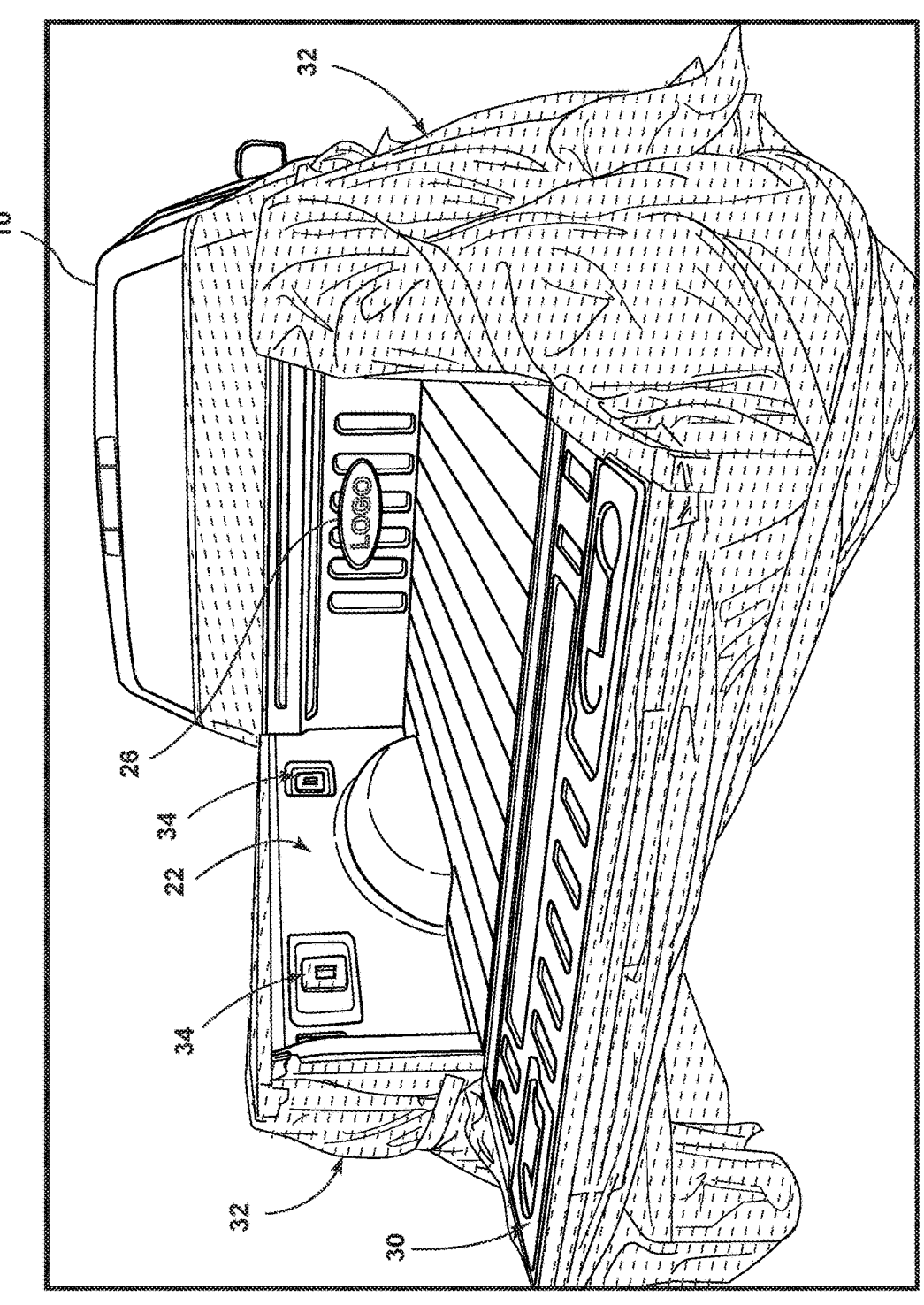
FIG. 11 is a pictorial view generally illustrating an embodiment of applying a coating to a vehicle, in accordance with teachings of the present disclosure.
Figure 12:
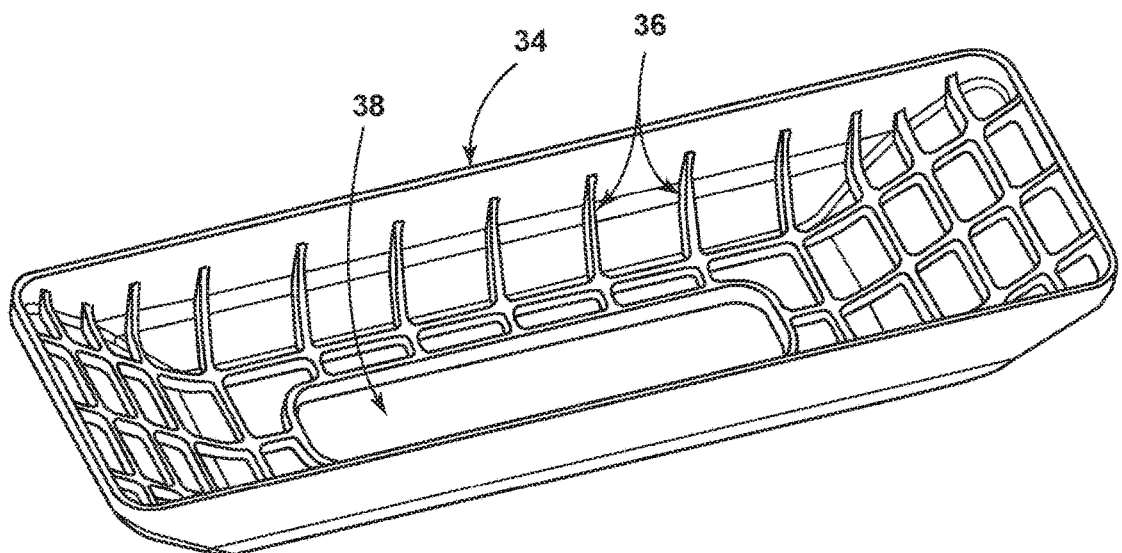
FIG. 12 is a pictorial view generally illustrating an embodiment of applying a coating to a vehicle, in accordance with teachings of the present disclosure.
Figure 13:
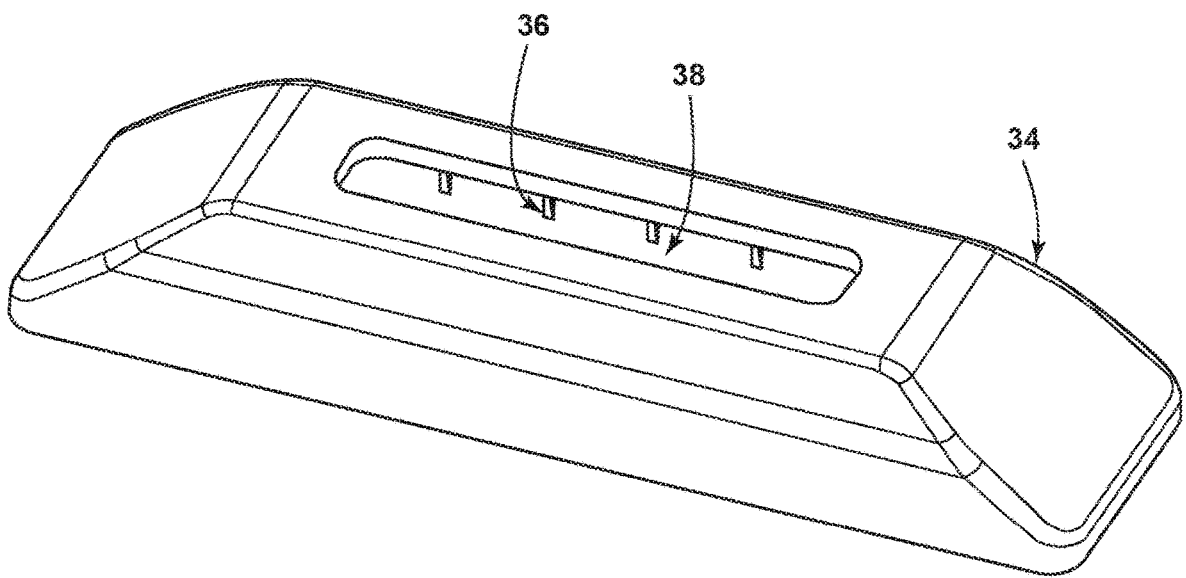
FIG. 13 is a pictorial view generally illustrating an embodiment of applying a coating to a vehicle, in accordance with teachings of the present disclosure.
Figure 14:
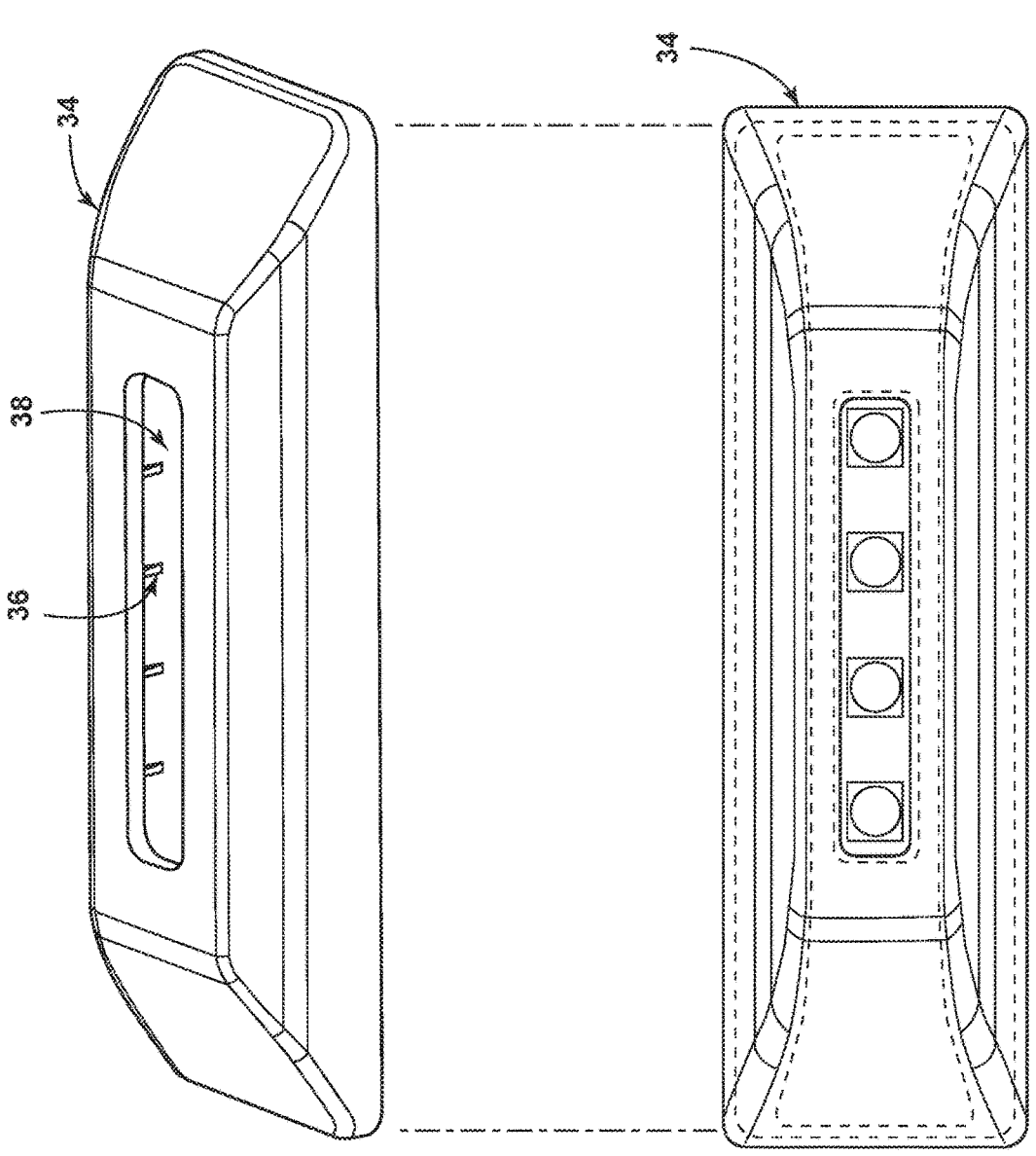
FIG. 14 is a pictorial view generally illustrating an embodiment of applying a coating to a vehicle, in accordance with teachings of the present disclosure.
Figure 15:
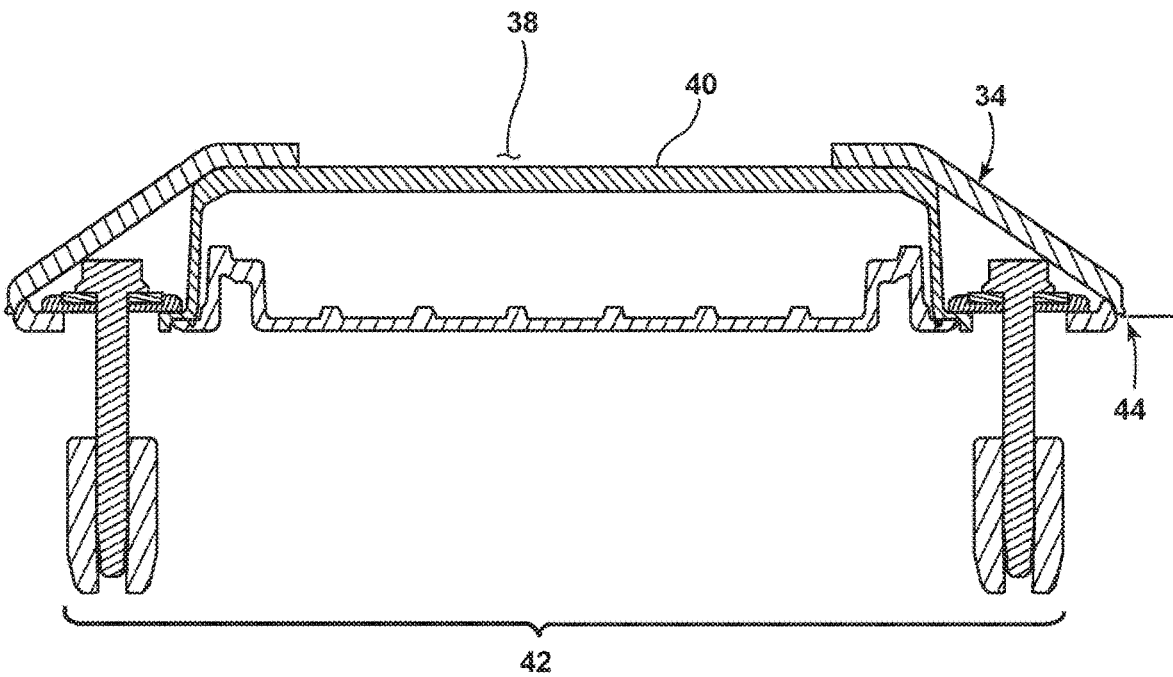
FIG. 15 is a cross-sectional view generally illustrating an embodiment of applying a coating to a vehicle, in accordance with teachings of the present disclosure.

FIG. 11 generally illustrates a vehicle 10 that may include a cargo bed 22 to receive a bed liner coating. Vehicle 10 may include a tailgate 30. At least a portion of vehicle 10 may be covered by masking materials 32, such as rear fenders and/or a portion of the rear window of vehicle 10. Vehicle 10 may include a logo 26 that may secured to a portion of cargo bed 22, such as, but not limited to, the bulkhead. Logo 26 may be applied by an operator using a fixture 24. It should be noted that it is anticipated that more than one logo 26 may be applied to cargo bed 22 of vehicle 10. The illustration of one logo 26 affixed to cargo bed 22 of vehicle 10 is merely exemplary, and not limiting.

Also shown in FIG. 11 are masking aids 34. In embodiments, masking aids 34 may be configured to engage specific items and/or equipment of a vehicle 10. For example, and without limitation, the items and/or equipment may include a lamp, a cargo hook, a drain plug, a speaker, a cargo management system, and/or a power tailgate control. Masking aids 34 may be configured using vehicle design (e.g., computer-aided design (CAD)) data that may permit the masking aid to engage with the items and/or equipment. Masking aids 34 may permit the coating to be applied such that a consistent boundary (e.g., trim edge, cut line) between the items and/or equipment and the coating may be provided.

Referring now to FIGS. 12-15, a masking aid 34 for use with a bed liner coating process is generally illustrated that may be used on a cargo bed 22 of a vehicle 10, or another portion of vehicle 10 that may receive a coating (e.g., cargo area of a van, exterior body panels). Masking aid 34 may be configured in forms and/or geometries (e.g., shapes) that may be determined by surfaces of items and/or equipment that may be engaged by masking aids 34. A trim edge 44 and/or profile of masking aids 34 may be factors contributing to the configuration of masking aids 34.

In embodiments, a masking aid 34 may be configured to fit over (e.g., engage) a component and/or accessory of vehicle 10, such as a lamp 42. Masking aid 34 may include a top side that may be covered with bed liner coating and a bottom side that may be configured to engage a component and/or accessory of vehicle 10. The top side of masking aid 34 may include an opening (e.g., aperture) 38 that may permit a portion of the accessory and/or component of vehicle 10 to be visible (e.g., exposed). In embodiments, masking aid 34 may include molded-in (e.g., integrated) elements that may engage an accessory, such as lamp 42 or other bed mounted accessories. In embodiments, masking aid 34 may include an adhesive element (e.g., tape) that may engage an accessory such as lamp 42. An operator 12 may apply a covering (e.g., tape) over opening 38, such that operator 12 may easily remove masking aid 34 after the coating has been applied to cargo bed 22 of vehicle 10. The bottom of masking aid 34 may be configured with braces (e.g., reinforcements) 36 that may provide strength and/or support to masking aid 34 (e.g., prevent flexing and/or distortion). Masking aid 34 may include identifying information (e.g., vehicle make and type) that may permit an operator to locate an appropriate masking aid 34 for vehicle 10 and/or accessory. For example, masking aid 34 may have the make, type, side, and/or model of vehicle 10 that may engage masking aid 34 that may be molded into a surface of masking aid 34.

In embodiments, a lamp 42 may be located within a cargo bed 22 of a vehicle 10. Lamp 42 may include a lens 40 that may engage a portion of masking aid 34. An operator 12 may place masking aid 34 over (e.g., on top of) lamp 42 such that masking aid 34 may fit on (e.g., engage) lamp 42. In embodiments, masking aid 34 may be constructed of a rigid or semi-rigid material (e.g., polymer). For example, masking aid 34 may be constructed (e.g., fabricated) such that masking aid 34 may slightly deform (e.g., flex) to fit on and/or over an accessory and/or component of vehicle 10. The physical properties of masking aid 34 may permit some deformation and/or a frictional fit that may retain (e.g., hold) masking aid 34 on the lamp 42 throughout the coating application and/or permit a trim edge 44 to be formed on the accessory and/or component of vehicle 10.

In embodiments, a masking aid 34 may be configured to permit efficient application and/or removal by an operator 12. For example, operator 12 may place a piece of tape on top of masking aid 34 and/or covering an opening 38. The piece of tape may protect a lens 40 of a lamp 42 from being covered by a coating and/or may permit operator 12 to easily remove masking aid 34, such as using the piece of tape as a handle. In embodiments, masking aid 34 may include a handle, grip, or other user-friendly device that may permit installation and/or removal. In embodiments, masking aid 34 may permit little and/or no secondary treatment (e.g., clean-up, reapplication of the coating) to remove unwanted coating (e.g., overspray) on and/or near the accessory and/or component of vehicle 10.

Figure 16:
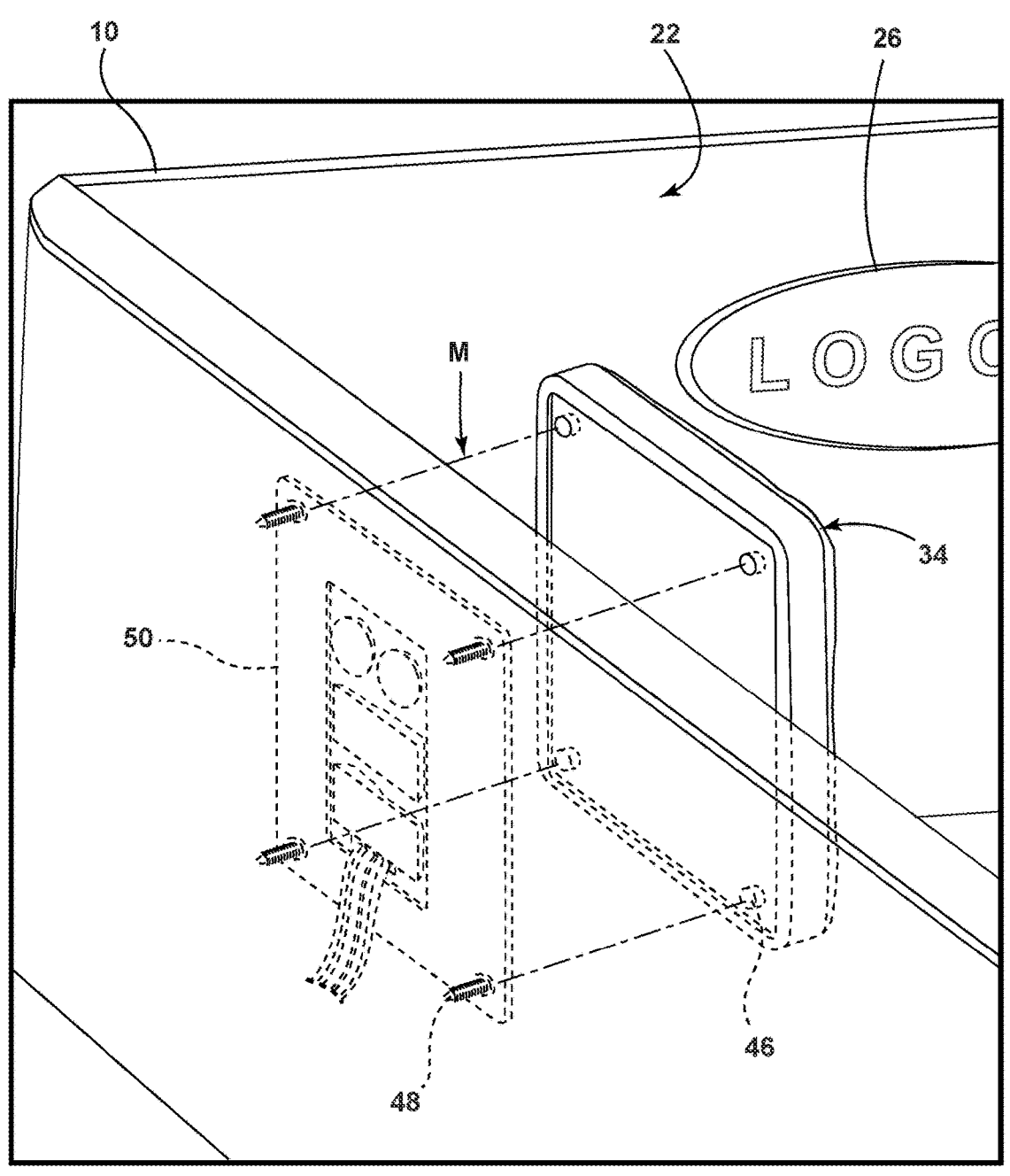
FIG. 16 is a cross-sectional view generally illustrating an embodiment of applying a coating to a vehicle, in accordance with teachings of the present disclosure.

Referring now to FIG. 16, a masking aid 34 for use with a bed liner coating process is generally illustrated that may be used on a component of a vehicle 10 that may be located in a cargo bed 22. In embodiments, masking aid 34 may include at least one magnet 46 that may be embedded in or otherwise fixably attached to masking aid 34. Magnets 46 may be of a type of magnets commonly known as "rare earth" magnets. Magnets 46 may be configured (e.g., arranged) relative to masking aid 34 that magnets 46 may engage fasteners 48 (e.g., screws, bolts) of a component 50 via a magnetic bond M. In embodiments, masking aid 34 may include magnets 46 that may engage portions of vehicle 10, such as, but not limited to, the body of vehicle 10.

In embodiments, a masking aid 34 may be constructed of a flexible material (e.g., silicone) that may flexibly engage a component 50 of a vehicle 10. Masking aid 34 may be configured with a degree of flexibility (e.g., semi-rigid) such that masking aid 34 may remain engaged with a component 50 throughout the bed liner coating application, but may be easily removed (e.g., peeled off) by an operator 12. In embodiments, masking aid 34 may include an integrated handle and/or grip that may enable operator 12 to easily remove masking aid 34 after the coating application. Masking aid 34 may include identifying information (e.g., vehicle make and type) that may permit an operator to locate an appropriate masking aid 34 for vehicle 10 and/or accessory. For example, masking aid 34 may have the make, type, side, and/or model of vehicle 10 that may engage masking aid 34 molded into a surface of masking aid 34. The flexibility of masking aid 34 may permit operator 12 to remove the coating that may be deposited on masking aid 34 and/or may permit the re-use of masking aid 34, reducing waste. Operator 12 may remove the dried coating and/or bonding primer by flexing (e.g., bending) masking aid 34 and/or causing the dried coating to break off of masking aid 34. Masking aid 34 may permit a clean trim line (e.g., edge) between the coating and/or bonding primer and component 50, without requiring additional work (e.g., scraping) by operator 12 to remove overspray coating from component 50 and/or vehicle 10.

Figure 17:
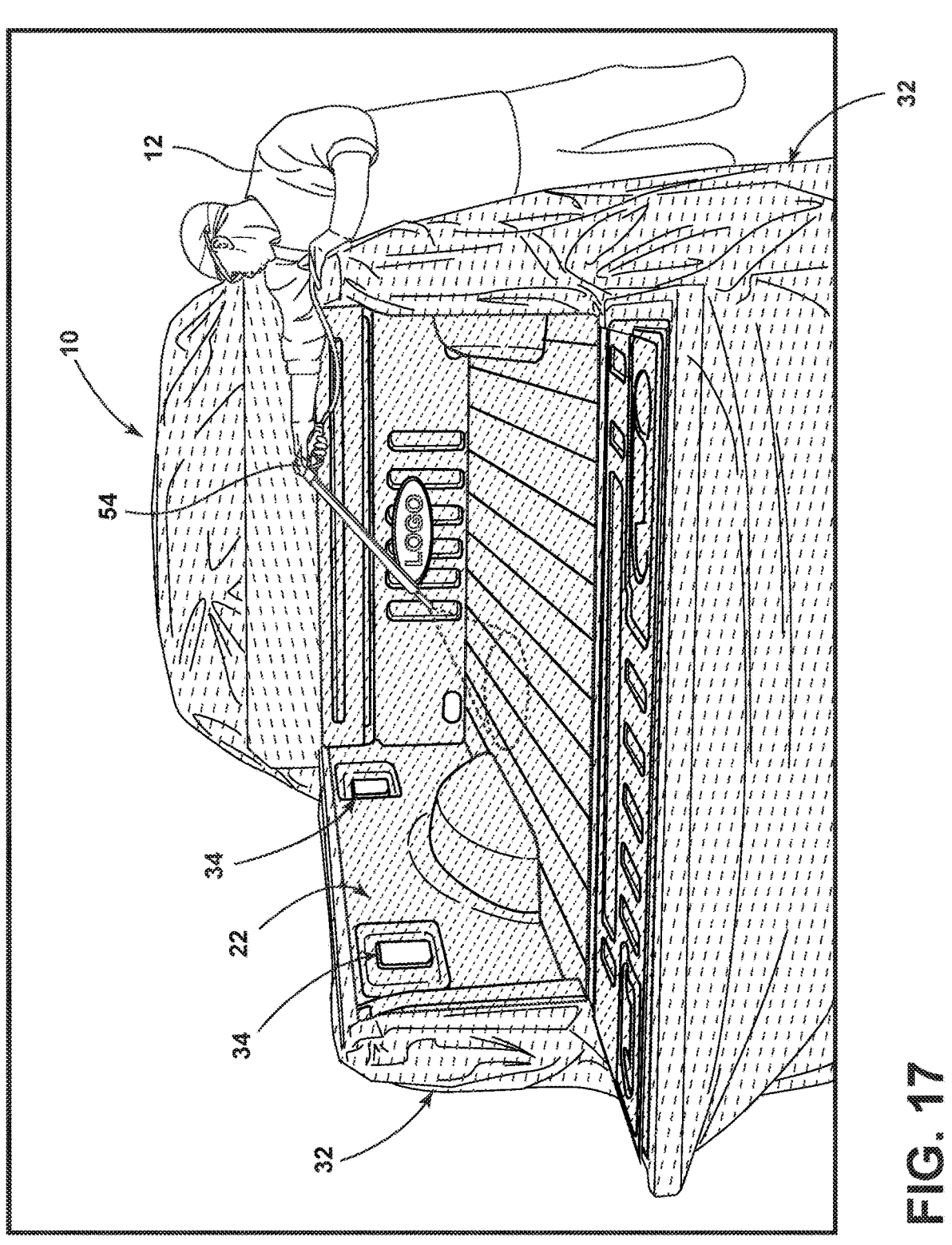
FIG. 17 is a pictorial view generally illustrating an embodiment of applying a coating to a vehicle, in accordance with teachings of the present disclosure.

FIG. 17 generally illustrates a vehicle 10 with a cargo bed 22, portions of which may be covered by a masking material 32 and/or masking aids 34, that may be receiving a bonding agent 52 prior to a bed liner coating. Bonding agent 52 may be applied over surfaces of a cargo bed 22, such as, but not limited to, oil-based paints, water-based paints, clear coats, primer, metal and/or polymers. Bonding agent 52 may be applied by an operator 12 or a programmable robot 56 directly to the surface of cargo bed 22, such as by a sprayer. Bonding agent 52 may eliminate and/or reduce the abrading of cargo bed 22 that may promote adhesion of the bed liner coating. In this way, the integrity of the surface of cargo bed 22 may be maintained (e.g., preserved), and/or an additional process step (e.g., physical abrasion) may be eliminated.

In embodiments, a bonding agent 52 may be, for example, a specially-designed, single-component, liquid primer that may be used for a bed liner coating (e.g., aromatic urethane polyurea) 58. Bonding agent 52 may be formulated to prepare the coating substrate (e.g., clear-coat, aromatic urethane polyurea, e-coat, etc.) of a cargo bed 22 for a coating 58 such that typical substrate preparation methods, for example scuffing and/or sanding, may not be required. Bonding agent 52 may provide improved inter-coat (e.g., between coat) adhesion between the existing surface (e.g., clear-coat, painted metal) of cargo bed 22 and/or coating 58.

In embodiments, a vehicle 10 may be located in a spray booth (not shown). In embodiments, a bonding agent 52 (e.g., UL Bonding Agent CO-50351-QT) 52 may be dispensed using a sprayer 54, controlled by an operator 12 and/or a programmable robot 56. Additionally and alternatively, bonding agent 52 may be dispensed using an applicator system with a programmable robot 56. Sprayer 54 may include a nozzle with a predetermined and/or adjustable flow rate. Sprayer 54 may restrict the amount of bonding agent 52 that may be applied by operator 12, for example and without limitation, approximately 30 mL. Additionally and alternatively, a pumping system (not shown) that may provide bonding agent 52 to sprayer 54 may restrict the amount of bonding agent 52 supplied (e.g., pumped) to sprayer 54. In embodiments, a dispensing system may provide operator 12 with directions (e.g., audible tones) that may assist operator 12 in applying bonding agent 52 to cargo bed 22 of vehicle 10. In embodiments, bonding agent 52 may be applied to cargo bed 22 such that the solvent(s) contained in the dispensed bonding agent 52 may disperse (e.g., flash-off) within 30-60 seconds of application to cargo bed 22, as shown in FIG. 18.

FIG. 19 generally illustrates a vehicle 10 with a cargo bed 22, portions of which may be covered by masking material 32 and/or masking aids 34, that may receive a bed liner coating 58 on top of a layer of a bonding agent 52 that may be dispensed by a programmable robot 56. Programmable robot 56 may include an applicator 60, such as a component applicator that may be configured to apply multiple components (e.g., coatings). In embodiments, applicator 60 may include more than one dispensing nozzle. In embodiments, applicator 60 may include an adjustable dispensing nozzle. Applicator 60 may be configured to dispense and/or mix two separate components of coating 58. In embodiments, applicator 60 may be configured to dispense and/or mix two separate components (e.g., isocyanate and/or polyol) of coating 58 at or near the dispensing point (e.g., exit from the nozzles) in a ratio (e.g., 1:1). Additionally and alternatively, applicator 60 may be configured to dispense and/or mix two separate components (e.g., isocyanate and/or polyol) of coating 58 a distance from the dispensing point in a ratio (e.g., 1:1). In embodiments, applicator 60 may be configured to receive one or more component of coating 58 and/or blend (e.g., mix) one or more component of bed liner coating 58 prior to dispensing.

In embodiments, a programmable robot 56 may be configured to receive data acquired by a scanner 16 and/or via an operator 12 using the VIN tracker database program pertaining to a vehicle 10. Data pertaining to vehicle 10 may include vehicle type, model, and/or size of a cargo bed 22 (e.g., 8-foot cargo bed). Additionally and alternatively, vehicle 10 may be located precisely in a spray booth using a tire locator device (not shown). Vehicle 10 may be parked by operator 12 in the spray booth such that one or more rear tires of vehicle 10 may engage a fixed (e.g., floor-mounted) tire locator (e.g., locking) device. Data pertaining to vehicle 10 may be based on (e.g., originated by) the location of a rear tire of vehicle 10, for example. In this way, the fixed tire locator device may permit the location of vehicle 10 (e.g., starting point) in three dimensions (e.g., x, y, and z) may be precisely established. Using this location, programmable robot 56 and/or a computer system (e.g., Programmable Logic Controller (PLC)) connected to programmable robot 56 may then determine (e.g., analyze) a dispensing profile (e.g., path) from an electronic library of profiles for programmable robot 56 that may manipulate applicator 60 to dispense coating 58. Additionally and alternatively, the location of vehicle 10 may be determined using a VIN tracker database program and/or a dispensing profile may be determined for programmable robot 56.

FIG. 20 generally illustrates a cross-section (not to scale) of a portion of a vehicle 10, such as, but not limited to, a cargo bed 22. Cargo bed 22 may include a coating of paint 62, on top of which a clear coat 64 may be applied. As shown in FIG. 17, an operator 12 and/or a programmable robot 56 may apply a bonding agent 52 on top of clear coat 64 and/or paint 62.

Additionally and alternatively, operator 12 may apply bonding agent 52 to another surface of cargo bed 22, such as, but not limited to, polymer and/or fiberglass.

Programmable robot 56 may be configured with an applicator 60 that may be configured to apply a bed liner coating 58.

Coating 58 may include a base coat (e.g., layer) 66 and/or a top coat (e.g., layer) 68. Additionally and alternatively, coating 58 may include additional coats and/or layers with similar or different characteristics.

In embodiments, an applicator 60 that may be operated by a programmable robot 56, may apply a bed liner coating 58 in a predetermined pattern and/or predetermined thickness (e.g., depth). For example and without limitation, applicator 60 may apply a base coat 66 of bed liner coating 58 at a first predetermined distance, pressure, and/or temperature from a cargo bed 22. In embodiments, applicator 60 may be positioned based on design data of a vehicle 10, such as, but not limited to, design data that may be obtained via a VIN tracker database program and/or other sources (e.g., vehicle manufacturer). In embodiments, applicator 60 may be positioned by programmable robot 56 at a first predetermined distance from a vertical surface of cargo bed 22 and a second predetermined distance from a horizontal surface of cargo bed 22. The difference between the first and second predetermined distances may be at least partially attributed to the effect of gravity and/or the draw of the air flow within the booth on the application (e.g., spraying) of bed liner coating 58 on cargo bed 22. In embodiments, a surface of cargo bed 22 may be horizontal and also negative (e.g., upside down). Applicator 60 may be positioned at a third distance from a horizontal and upside down surface (e.g., underside) of cargo bed 22.

In embodiments, gravity may affect the dispensing of a bonding agent 52 and/or a bed liner coating 58. For example, a vertical surface of a cargo bed 22 may require more application cycles (e.g., passes) than a horizontal surface of cargo bed 22 that may prevent running of bonding agent 52 and/or coating 58. Dispensing on a vertical surface of cargo bed 22 may include more application cycles that a horizontal surface but less coating may be applied per application cycle. The coating 58 that may be applied to a vertical surface of cargo bed 22 may have more time to dry (e.g., cure) due to the thinner and/or lighter coating that may be applied and/or may resist gravity (e.g., resist "runs") in coating 58 on cargo bed 22.

In embodiments, an applicator 60, operated by a programmable robot 56, may apply a bed liner coating (e.g., aromatic urethane polyurea) 58 in a predetermined pattern and/or predetermined thickness (e.g., depth). For example and without limitation, applicator 60 may apply a top coat 68 over (e.g., on top of) a base coat 66 of coating 58 at a predetermined distance from a cargo bed 22. In embodiments, base coat 66 may include more than one layer (e.g., two or more layers). In embodiments, base coat 66 may include a first layer that may be applied in a fore/aft (e.g., front/rear) direction and/or a second layer that may be applied in a cross-car (e.g., side-to-side) direction. In embodiments, base coat 66 may be configured with a first layer of a first type of coating (e.g. aromatic urethane polyurea) and/or a second layer of a second type of coating (e.g., aliphatic urethane polyurea). In embodiments, base coat 66 may include three or more layers that may be applied in different patterns and/or types of coatings, such as those described above. In embodiments, applicator 60 may be positioned based on design data of a vehicle 10, such as, but not limited to, design data that may be obtained and/or linked to via a VIN tracker database program and/or other sources (e.g., vehicle manufacturer). In embodiments, applicator 60 may be positioned by programmable robot 56 at a second predetermined distance from a vertical surface of cargo bed 22. The distance from the vertical surface of cargo bed 22 may include additional movement by the programmable robot 56 and/or applicator 60. The distance may be selected based upon several parameters, such as, but not limited to, environmental and/or coating characteristics (e.g., humidity, temperature and/or pressure). By applying (e.g., spraying) coating 58 at the fourth distance, coating 58 may change (e.g., cure, dry, harden) from a liquid to a solid between leaving applicator 60 and contacting base coat 66.

In embodiments, a bed liner coating 58 may bind together (e.g., clump) and/or form nodules 70 after leaving an applicator 60 but before contacting a base coat 66 when applicator 60 is beyond a predetermined distance (e.g., a distance further than base coat applicator distance) from a cargo bed 22. Nodules 70 may be configured to adhere to base coat 66 and/or other nodules 70, accumulating (e.g., stacking, clumping) to form a top coat 68 of bed liner coating 58. A programmable robot 56 and/or applicator 60 may be configured for additional movements when located at a predetermined distance from a cargo bed 22. For example and without limitation, the additional movements may include a random, back-and-forth, and/or orbital movement. The additional movement of programmable robot 56 and/or applicator 60 may promote the formation and/or dispersion (e.g., spreading) of nodules 70 that may accumulate (e.g., build up on) to form top coat 68 of coating 58.

In embodiments, a bed liner coating (e.g., aromatic and/or aliphatic urethane polyurea) 58 may be applied by a programmable robot 56 and/or applicator 60 such that bonding agent 52 and/or coating 58 may cover a logo 26 that may be affixed to a portion of a cargo bed 22 of a vehicle 10. Logo 26 may be covered by a base coat 66 and/or a top coat 68 of coating 58 such that logo 26 may appear to be integrated (e.g., sealed beneath) coating 58. In embodiments, a programmable robot 56 and/or an applicator 60 may include a metering device (not shown) to measure the volume of a bed liner coating (e.g., aromatic urethane polyurea) 58 applied to a cargo bed 22 of a vehicle 10. In embodiments, the metering device may be included with a pumping system that may supply coating 58 to programmable robot 56 and/or applicator 60. The metering device may be configured to report (e.g., analyze, measure) the amount (e.g., volume) of coating 58 dispensed and/or provide the amount to a PLC and/or a VIN tracker database program, for example. The PLC may then compare the amount of coating 58 applied to previous a vehicle 10 with the same characteristics (e.g., 8-foot bed, four-wheel drive). The PLC may determine, based upon the previous vehicle 10 that was measured by an operator 12 using a thickness gauge 72, as shown in FIG. 21.

In embodiments, a programmable robot 56, applicator 60 and/or a supply system (e.g., pumping equipment) of a bed liner coating 58 may be configured to measure the amounts (e.g., volume) of a bonding agent 52 and/or coating 58 that may have been applied to a cargo bed 22 of a vehicle 10. This information may be provided to a PLC and measured against predetermined (e.g., pre-measured) amounts using real-time pressure, temperature and volume data from programmable robot 56, applicator 60, and/or the coating 58/bonding agent 52 supply system. The amounts of bonding agent 52 and/or coating 58 may be delivered (e.g., supplied electronically) via a communications gateway module to an independent workstation that may be equipped with statistical process control (SPC) software. The SPC software may analyze the data and/or compare the data against the predetermined amounts. Additionally and alternatively, the SPC software may analyze the data to determine if the amounts applied to cargo bed 22 may be within a desired range given other environmental factors (e.g., humidity, temperature, and/or pressure). There may be discrepancies in the amounts applied by programmable robot 56 and/or applicator 60 and the predetermined amounts applied to similar cargo beds 22. These discrepancies may be a result of ambient temperature, humidity, physical properties of coating 58 (e.g. density), and/or the conditions of programmable robot 56, applicator 60, and/or supply system.

In embodiments, analysis of the amounts of a bonding agent 52 and/or a coating 58 that may have been applied to a cargo bed 22 versus the amounts applied to similar cargo beds 22 may be used by SPC software and/or VIN tracker database program to determine if the amounts of bonding agent 52 and/or coating 58 that may have been applied to a cargo bed 22 are within the ranges deemed acceptable (e.g., from previously measured and approved samples). If the analysis determines that the amounts of bonding agent 52 and/or coating 58 may be within the ranges deemed acceptable, a database including VIN data for a vehicle 10, that may be originally obtained by an operator 12 using scanner 16, the database may be updated accordingly and/or vehicle 10 may be moved to a de-masking station. If the analysis determines that the amounts of bonding agent 52 and/or coating 58 may be outside predetermined ranges, the database including VIN data for vehicle 10 may be updated accordingly, and/or vehicle 10 may be moved to a rework station within facility 11.

FIGS. 22-24 generally illustrate a vehicle 10 that may include a cargo bed 22 with a bed liner coating 58. Vehicle 10 may include masking material 32 covering portions of vehicle 10 that may not have received coating 58. An operator 12 may remove (e.g., de-mask) masking 32 and/or masking aids 34 from vehicle 10, leaving a trim line between portions of cargo bed 22 and/or components 50 that may have been covered (e.g., masked) by masking 32 and/or masking aids 34 that may reveal a trim line 76 between component 50 and/or coating 58.

FIGS. 25-26 generally illustrate a vehicle 10 that may include a cargo bed 22 with a bed liner coating 58. A logo 26 may be included (e.g., over-coated) by coating 58 into cargo bed 22. A tailgate 30 may be included with vehicle 10 and/or may also include coating 58.

Components 50 may be included in cargo bed 22 of vehicle 10. Components 50 may be uncoated (e.g., uncovered) by coating 58 due to masking aids 34. Portions of vehicle 10 may be uncoated by coating 58, such as, but not limited to, the outer fenders and/or tailgate of vehicle 10. An operator 12 may be using a cloth 78 that may include a cleaner and/or solvent to remove adhesive residue from masking 32 and/or masking aids 34.

FIG. 27 generally illustrates a vehicle 10 that may include an operator 12 and/or a bed liner coating 58. Operator 12 may scan the VIN using a scanner 16, that may be provided to a VIN tracker database program and/or update a vehicle database located at facility 11. Vehicle 10 may be moved by operator 12 to a post-coating station in facility 11. At the post-coating station, additional equipment may be installed on vehicle 10 that may not have been suitable for installation prior to application of bed liner coating 58 (e.g., cargo bed ramps, tonneau cover, decals). In the post-coating station, vehicle 10 may be tested by operator 12 using a thickness gauge 72 to collect data regarding the coating 58 and/or any additional quality review may be completed by operator 12. Vehicle 10 may be scanned (e.g., logged) out of facility 11 using scanner 16 for transportation to the vehicle manufacture location and/or another designated retrieval location.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that the electronic vehicle inventory and tracking system may include a main electronic control unit, as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure includes a computer-readable storage medium having a computer program encoded thereon for implementing the vehicle inventory, tracking and application logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

17

18

What is claimed is:

1. A method of applying a bed liner coating to first and second vehicles, the method comprising:

covering a first protectible vehicle component with a reusable masking aid, wherein the reusable masking aid comprises an interior surface defining a cavity and an exterior surface, wherein the first protectible vehicle component is received in the cavity;

applying a first bed liner coating to the exterior surface of the reusable masking aid and adjacent portions of the first vehicle not covered by the reusable masking aid;

removing the reusable masking aid from the first protectible vehicle component;

removing the bed liner coating applied to the exterior surface of the reusable masking aid;

covering a second protectible vehicle component with the reusable masking aid, wherein the second protectible vehicle component is received in the cavity;

applying a second bed liner coating to the exterior surface of the reusable masking aid and adjacent portions of the second vehicle not covered by the reusable masking aid;

and removing the reusable masking aid from the second protectible vehicle component, wherein the first protectible vehicle component protrudes from a vehicle bed surface of the first vehicle and comprises sides, wherein the second protectible vehicle component protrudes from a vehicle bed surface of the second vehicle and comprises sides, and wherein the reusable masking aid comprises a top and sidewalls comprising interior surfaces defining the cavity, wherein covering the first protectible vehicle component with the reusable masking aid comprises inserting the first protectible vehicle component into the cavity with the sidewalls surrounding the sides of the first protectible component; wherein applying the first bed liner coating to the adjacent portions of the first vehicle comprises applying the first bed liner coating to the vehicle bed surface of the first vehicle not covered by the reusable masking aid, wherein covering the second protectible vehicle component with the reusable masking aid comprises inserting the second protectible vehicle component into the cavity with the sidewalls surrounding the sides of the second protectible component, and wherein applying the second bed liner coating to the adjacent portions of the second vehicle comprises applying the second bed liner coating to the vehicle bed surface of the second vehicle not covered by the reusable masking aid.

2. The method of claim 1 wherein covering the first protectible vehicle component with the reusable masking aid comprises frictionally engaging the sides of the first protectible vehicle component with the interior surfaces of the side walls of the reusable masking aid surrounding the sides of the first protectible vehicle component and thereby retaining the reusable masking aid on the first protectible vehicle component free of any support by a human operator.

3. The method of claim 1 wherein the first protectible vehicle component comprises a lamp, a cargo hook, a drain plug, a speaker, a cargo management system and/or a power tailgate control.

4. The method of claim 1 wherein the reusable masking aid comprises an opening in the top between the exterior and interior surfaces, and further comprising applying an adhesive tape to the exterior surface of the top and thereby covering the opening, and wherein covering the first protectible vehicle component with the reusable masking aid comprises adhering the adhesive tape covering the opening to the first protectible vehicle component.

5. The method of claim 4 wherein removing the reusable masking aid from the first protectible vehicle component comprises using the tape as a handle.

6. The method of claim 1 wherein a peripheral edge of the reusable masking aid is tapered.

7. The method of claim 1 wherein the first protectible vehicle component comprises a fastener, and wherein the reusable masking aid comprises a magnet, and wherein covering the first protectible vehicle component with the reusable masking aid comprises magnetically bonding the magnet to the fastener.

8. The method of claim 1 wherein the reusable masking aid comprises identifying information pertaining to the make and/or model of the first vehicle.

9. A method of applying a bed liner coating to a vehicle comprising:

providing a reusable masking aid, wherein the reusable masking aid comprises a top and sidewalls having interior surfaces defining a cavity and exterior surfaces and an opening between the exterior and interior surfaces;

applying an adhesive tape to the exterior surface of the top and thereby covering the opening;

covering a protectible vehicle component with the reusable masking aid, wherein the protectible vehicle component protrudes from a vehicle bed surface of the vehicle and comprises sides, wherein the sidewalls surround the sides of the protectible component;

adhering the adhesive tape covering the opening to the protectible vehicle component;

applying a first bed liner coating to the exterior surface of the reusable masking aid, an exterior surface of the adhesive tape and adjacent portions of the vehicle bed surface of the vehicle not covered by the reusable masking aid;

removing the reusable masking aid from the protectible vehicle component; and removing the bed liner coating applied to the exterior surface of the reusable masking aid.

10. The method of claim 9 wherein removing the reusable masking aid from the protectible vehicle component comprises using the adhesive tape as a handle.

11. The method of claim 10 further comprising removing the adhesive tape from the reusable masking aid.

12. A method of applying a bed liner coating to a vehicle comprising:

providing a reusable masking aid, wherein the reusable masking aid comprises a top and sidewalls having interior surfaces defining a cavity and exterior surfaces and a grippable handle;

covering a protectible vehicle component with the reusable masking aid, wherein the protectible vehicle component protrudes from a vehicle bed surface of the vehicle and comprises sides, wherein the sidewalls surround the sides of the protectible component;

applying a bed liner coating to the exterior surface of the reusable masking aid and adjacent portions of the vehicle bed surface of the vehicle not covered by the reusable masking aid;

gripping the grippable handle; and removing the reusable masking aid from the protectible vehicle component using the grippable handle.

13. The method of claim 12 wherein the grippable handle comprises a piece of tape adhered to the exterior surface of the top.

14. The method of claim 13 wherein the reusable masking aid comprises an opening between the exterior and interior surfaces, and further comprising covering the opening with the piece of tape prior to applying the bed liner coating.

15. The method of claim 14 wherein covering the protectible vehicle component with the reusable masking aid comprises adhering the piece of tape covering the opening to the protectible vehicle component.

16. The method of claim 13 further comprising removing the piece of tape from the reusable masking aid after removing the reusable masking aid from the protectible vehicle component.

17. The method of claim 12 wherein covering the protectible vehicle component with the reusable masking aid comprises frictionally engaging the sides of the protectible vehicle component with the interior surface of the sidewalls of the reusable masking aid surrounding the sides of the first protectible vehicle component and thereby retaining the reusable masking aid on the first protectible vehicle component free of any support by a human operator.

18. The method of claim 12 wherein a peripheral edge of the reusable masking aid is tapered.

19. The method of claim 12 wherein the protectible vehicle component comprises a fastener, and wherein the reusable masking aid comprises a magnet, and wherein covering the protectible vehicle component with the reusable masking aid comprises magnetically bonding the magnet to the fastener.

20. The method of claim 12 wherein the reusable masking aid comprises identifying information pertaining to the make and/or model of the first vehicle.

* * * * *